US012803759B2

(12) United States Patent
Guo et al.

(10) Patent No.: US 12,803,759 B2
(45) Date of Patent: Nov. 17, 2026

(54) HARQ CODEBOOK AND FEEDBACK FOR MULTI-PDSCH REPETITIONS

(71) Applicant: QUALCOMM Incorporated, San Diego, CA (US)

(72) Inventors: Shaozhen Guo, Beijing (CN); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/695,650

(22) PCT Filed: Nov. 23, 2021

(86) PCT No.: PCT/CN2021/132420

§ 371 (c)(1),
(2) Date: Mar. 26, 2024

(87) PCT Pub. No.: WO2023/092275

PCT Pub. Date: Jun. 1, 2023

(65) Prior Publication Data

US 2024/0405950 A1 Dec. 5, 2024

(51) Int. Cl.
*H04L 5/00* (2006.01)
*H04L 1/08* (2006.01)
(Continued)

(52) U.S. Cl.
CPC ....... *H04L 5/0055* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2020/0136770 A1 | 4/2020 | Khoshnevisan et al. | |
| 2022/0255706 A1* | 8/2022 | Song | H04L 1/1812 |

(Continued)

FOREIGN PATENT DOCUMENTS

| | | |
|---|---|---|
| CN | 110324132 A | 10/2019 |
| WO | 2020091973 | 5/2020 |
| WO | 2021030947 A1 | 2/2021 |

OTHER PUBLICATIONS

International Search Report and Written Opinion—PCT/CN2021/132420—ISA/EPO—Apr. 24, 2022.

(Continued)

*Primary Examiner* — Jenee Holland
(74) *Attorney, Agent, or Firm* — Dinsmore & Shohl LLP

(57) ABSTRACT

Certain aspects of the present disclosure provide techniques for determining and providing HARQ-ACK feedback corresponding to multiple PDSCHs scheduled by a DCI, which schedules a first PDSCH for transmitting repetitions of a first transport block (TB) and at least a second PDSCH for transmitting repetitions of a second TB. A UE monitors for repetitions of the first and the second PDSCH in a set of candidate PDSCH reception occasions corresponding to an uplink slot for transmitting the feedback. The set of candidate PDSCH reception occasions are based on a set of downlink slots corresponding to a reference repetition of each of the first TB and the second TB and a set of start and length indicator values (SLIVs) corresponding to the set of DL slots. The UE then transmits the feedback indicating results of the monitoring, based on a codebook generated according to the set of candidate PDSCH reception occasions.

26 Claims, 22 Drawing Sheets

(51) Int. Cl.
*H04L 1/1829* (2023.01)
*H04W 72/0446* (2023.01)

(56) References Cited

U.S. PATENT DOCUMENTS

| | | | | |
|---|---|---|---|---|
| 2022/0279454 | A1* | 9/2022 | Papasakellariou .... | H04W 72/23 |
| 2022/0346104 | A1* | 10/2022 | Yi ......................... | H04L 1/1854 |
| 2023/0232380 | A1* | 7/2023 | Bhamri ..................... | H04L 1/08<br>370/329 |
| 2024/0089037 | A1* | 3/2024 | Zeng ..................... | H04L 1/1893 |
| 2025/0374278 | A1* | 12/2025 | Saber ................ | H04W 72/1273 |

OTHER PUBLICATIONS

Samsung: "Alignment CR for TS 38.213", 3GPP TSG-RAN WG 1 Meeting #103-e, R1-2008124, e-Meeting, Oct. 26-Nov. 13, 2020, Section 9.1, 171 Pages.

* cited by examiner

300
One Frame (TDD)
10 ms
subframe
slot
RB
subcarrier
OFDM symbol
DMRS Rx
CSI-RS 330
PDCCH
SSS
PSS
PDSCH
PBCH
SS/PBCH Block
20 RBs
system bandwidth 350
SRS
DMRS R
SRS Comb 0
SRS Comb 1

380
PUCCH
PUSCH
RBs

HARQ CODEBOOK AND FEEDBACK FOR MULTI-PDSCH REPETITIONS

CROSS-REFERENCE TO RELATED APPLICATIONS

This application is a national stage application under 35 U.S.C. 371 of PCT/CN2021/132420 filed Nov. 23, 2021, which is hereby expressly incorporated by reference herein in its entirety as if fully set forth below and for all applicable purposes.

INTRODUCTION

Aspects of the present disclosure relate to wireless communications, and more particularly, to techniques for providing hybrid automatic repeat request (HARQ) acknowledgement (ACK) (HARQ-ACK) feedback.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method includes receiving downlink control information (DCI) that schedules: a first physical downlink shared channel (PDSCH) for transmitting repetitions of a first transport block (TB) and at least a second PDSCH for transmitting repetitions of a second TB. The method further includes monitoring for repetitions of the first PDSCH and the second PDSCH in a set of candidate PDSCH reception occasions corresponding to an uplink slot for transmitting hybrid automatic repeat request acknowledgement (HARQ-ACK) feedback. The set of candidate PDSCH reception occasions are based on a set of downlink (DL) slots corresponding to a reference repetition of each of the first TB and the second TB and a set of start and length indicator values (SLIVs) corresponding to the set of DL slots. The method includes transmitting the HARQ-ACK feedback indicating results of the monitoring, wherein the HARQ-ACK feedback is based on a codebook generated according to the set of candidate PDSCH reception occasions.

One aspect provides a method for wireless communications by a network entity. The method includes transmitting, to a UE, DCI that schedules: a first PDSCH for transmitting repetitions of a first TB and at least a second PDSCH for transmitting repetitions of a second TB. The method further includes providing repetitions of the first PDSCH and the second PDSCH to the UE, in a set of candidate PDSCH reception occasions at the UE. The set of candidate PDSCH reception occasions corresponds to an uplink slot for transmitting HARQ-ACK feedback and is based on a set of DL slots corresponding to a reference repetition of each of the first TB and the second TB and a set of SLIVs corresponding to the set of DL slots. The method includes receiving the HARQ-ACK feedback from the UE, wherein the HARQ-ACK feedback is based on a codebook generated according to the set of candidate PDSCH reception occasions.

One aspect provides an apparatus for wireless communications by a UE. The apparatus includes a memory and a processor coupled to the memory. The processor and the memory are configured to receive DCI that schedules a first PDSCH for transmitting repetitions of a first TB and at least a second PDSCH for transmitting repetitions of a second TB. The processor and the memory are further configured to monitor for repetitions of the first PDSCH and the second PDSCH in a set of candidate PDSCH reception occasions corresponding to an uplink slot for transmitting HARQ-ACK feedback. The set of candidate PDSCH reception occasions are based on a set of DL slots corresponding to a reference repetition of each of the first TB and the second TB and a set of SLIVs corresponding to the set of DL slots. The processor and the memory are configured to transmit the HARQ-ACK feedback indicating results of the monitoring, wherein the HARQ-ACK feedback is based on a codebook generated according to the set of candidate PDSCH reception occasions.

One aspect provides non-transitory computer readable medium storing instructions that when executed by a UE cause the UE to receive DCI that schedules a first PDSCH for transmitting repetitions of a first TB and at least a second PDSCH for transmitting repetitions of a second TB. The non-transitory computer readable medium stores the instructions that cause the UE to monitor for repetitions of the first PDSCH and the second PDSCH in a set of candidate PDSCH reception occasions corresponding to an uplink slot for transmitting HARQ-ACK feedback. The set of candidate PDSCH reception occasions are based on a set of DL slots corresponding to a reference repetition of each of the first TB and the second TB and a set of SLIVs corresponding to the set of DL slots. The non-transitory computer readable medium stores the instructions that cause the UE to transmit the HARQ-ACK feedback indicating results of the monitoring, wherein the HARQ-ACK feedback is based on a codebook generated according to the set of candidate PDSCH reception occasions.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
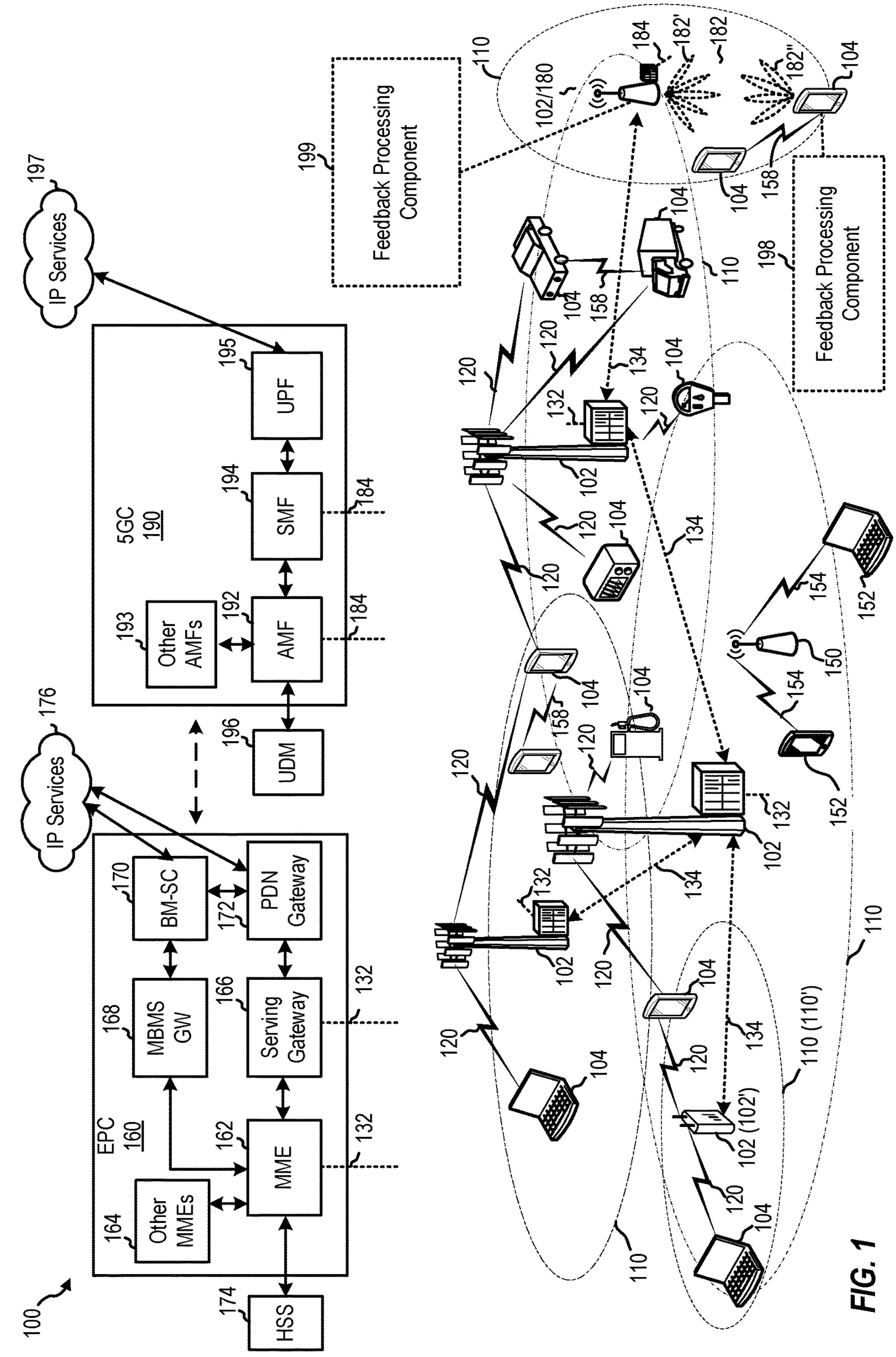
FIG. 1 is a block diagram conceptually illustrating an example wireless communication network.

Aspects of the present disclosure provide apparatuses, methods, processing systems, and computer-readable mediums for determining and providing hybrid automatic repeat request (HARQ) acknowledgement (ACK) feedback corresponding to multiple physical downlink shared channels (PDSCHs) with repetitions scheduled by downlink control information (DCI).

For example, the DCI may schedule a first PDSCH for transmitting repetitions of a first transport block (TB) and at least a second PDSCH for transmitting repetitions of a second TB. A user equipment (UE) monitors for repetitions of the first PDSCH and the second PDSCH in a set of candidate PDSCH reception occasions corresponding to an uplink slot for transmitting the HARQ-ACK feedback. The set of candidate PDSCH reception occasions are based on a set of DL slots corresponding to a reference repetition of each of the first TB and the second TB and a set of start and length indicator values (SLIVs) corresponding to the set of DL slots. The UE then transmits the HARQ-ACK feedback indicating results of the monitoring. The HARQ-ACK feedback may be based on a codebook generated according to the set of candidate PDSCH reception occasions.

In general, a HARQ codebook (e.g., a dictionary containing sequences of bits) is used to provide feedback for downlink (DL) data transmission. The HARQ codebook may be used by a UE to transmit, to a base station, one or more positive acknowledgments (ACKs) or negative acknowledgements (NACKs) that correspond to PDSCHs. There are generally two types of HARQ codebooks: Type 1 and Type 2. Type 1 generally refers to a fixed size codebook provided via radio resource control (RRC) signaling. Type 2 generally refers to a codebook that has a dynamic size that may change according to resource allocation.

Aspects of the present disclosure provide techniques that may be applied to provide Type-1 HARQ-ACK feedback for multiple PDSCH repetitions. For example, the techniques may be used to provide feedback when a single DCI schedules multiple PDSCHs, each for transmitting repetitions of a transport block (TB).

For a serving cell and an active DL bandwidth part (BWP), a UE may determine a set of candidate PDSCH reception occasions to monitor for PDSCH repetitions. The UE may transmit corresponding HARQ-ACK information (indicating whether or not one or more repetitions was received in a given reception occasion) in a physical uplink control channel (PUCCH) in a slot. The determination is based on a set of slot timing values or the configured HARQ-ACK feedback timing value ($K_1$), a set of row indexes (R) of a table that is associated with the active DL BWP, and other factors. The set of row indexes defines respective sets of slot offsets ($K_0$), start and length indicator values (SLIVs), and PDSCH mapping types for PDSCH reception. Conventional Type-1 HARQ-ACK codebook determination has been limited to single-PDSCH repetitions (e.g., scheduling one PDSCH with repetitions of a TB) or multi-PDSCH scheduling (e.g., scheduling multiple PDSCH transmissions without repetition), but not for scheduling a combination of multiple PDSCH transmissions, with each scheduled PDSCH for transmitting repetitions of a TB (herein "multi-PDSCH repetitions").

Aspects of the present disclosure provide various techniques for determining the type-1 HARQ-ACK codebook (e.g., determining the set of slot timing values and SLIVs therein) for such multi-PDSCH repetitions.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes feedback processing component 199, which may be configured to process transmissions based on TCI states mapped to TCI codepoints indicated Wireless network 100 further includes feedback processing component 198, which may be used configured to perform downlink and uplink panel switching according to indicated TCI states.

Figure 2:
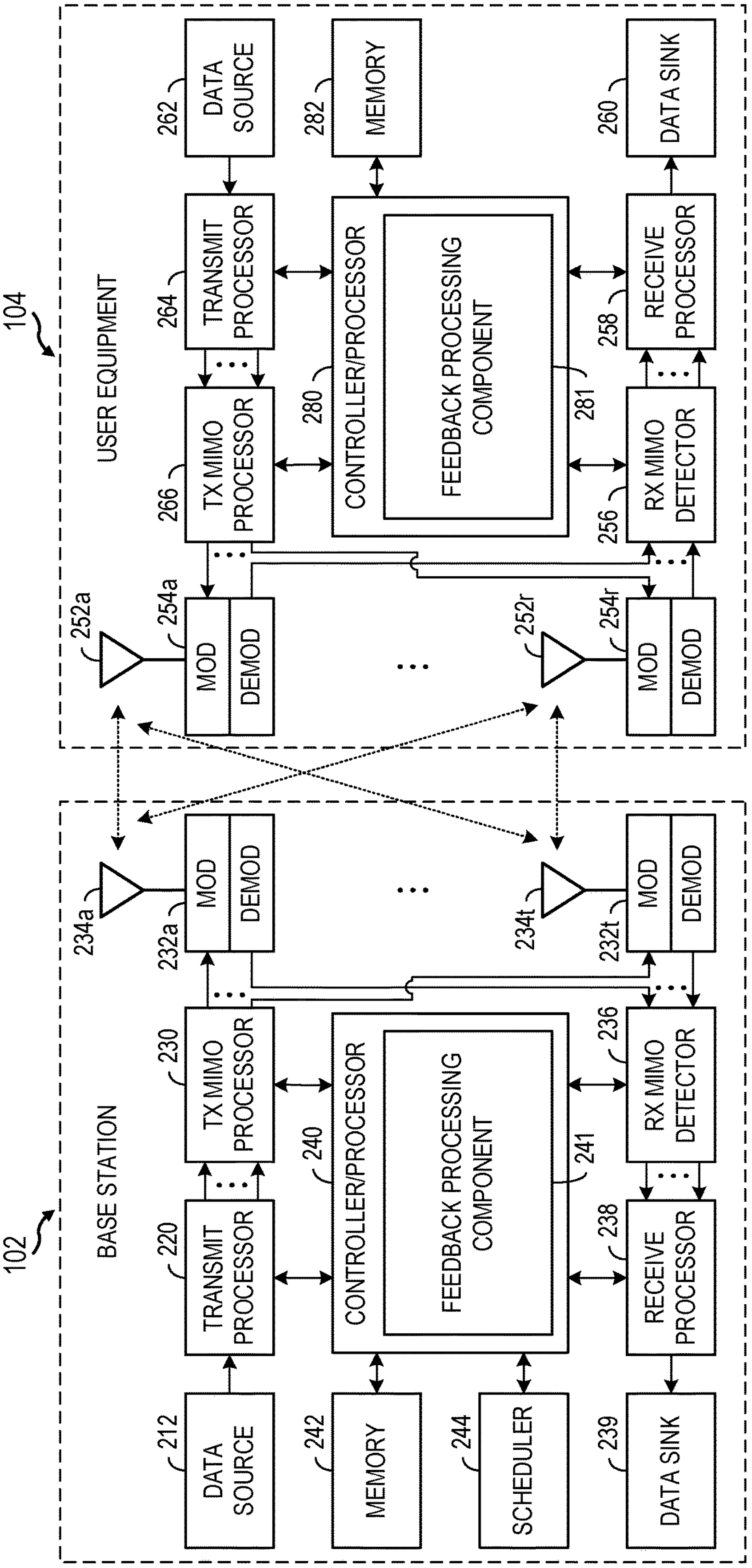
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes feedback processing component 241, which may be representative of feedback processing component 199 of FIG. 1. Notably, while depicted as an aspect of controller/processor 240, feedback processing component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes feedback processing component 281, which may be representative of feedback processing component 198 of FIG. 1. Notably, while depicted as an aspect of controller/processor 280, feedback processing component 281 may be implemented additionally or alternatively in various other aspects of user equipment 104 in other implementations.

Figures 3A, 3B, 3C, 3D:
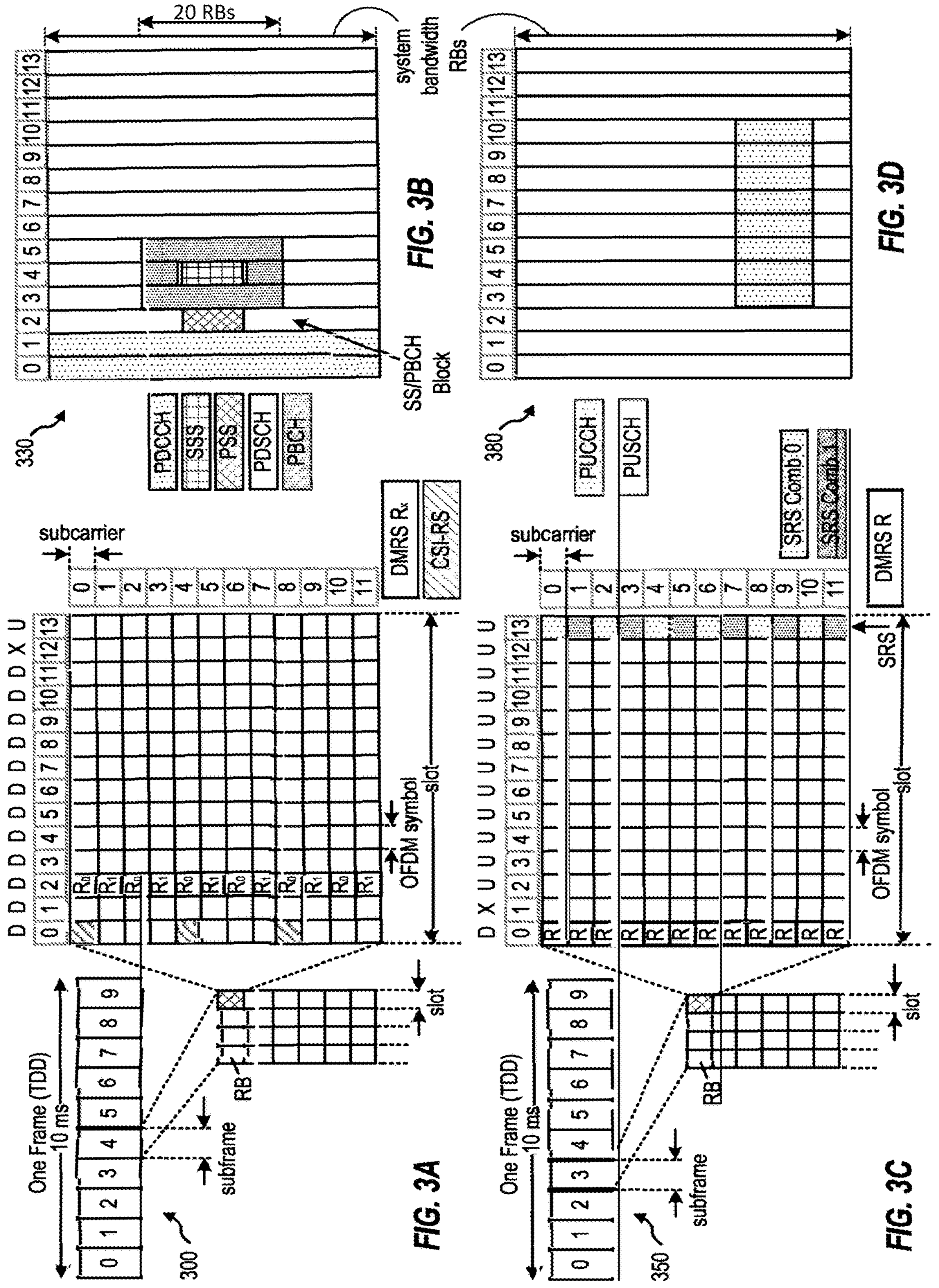
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “Sub-6 GHz” band in various documents and articles. A similar nomenclature issue sometimes occurs with regard to FR2, which is sometimes referred to (interchangeably) as a “millimeter wave” (“mmW” or “mmWave”) band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming. Therefore, multiple transmission reception points (multi-TRPs) or communications via multiple radio access links using the plurality of antennas or panels may be used to counteract path loss or otherwise to improve channel reliability.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Further, as described herein, understanding beam failure reasons may facilitate beam recovery and therefore facilitate mmWave communication deployments. Enhanced beam failure detection in mmWave transmission may improve service connectivity and reliability, including high mobility scenarios or ultra-dense deployments. For example, recovery methods or strategies based on signal interference would be different from noise issues.

Example Type-1 HARQ-ACK Codebook

Figure 4A:
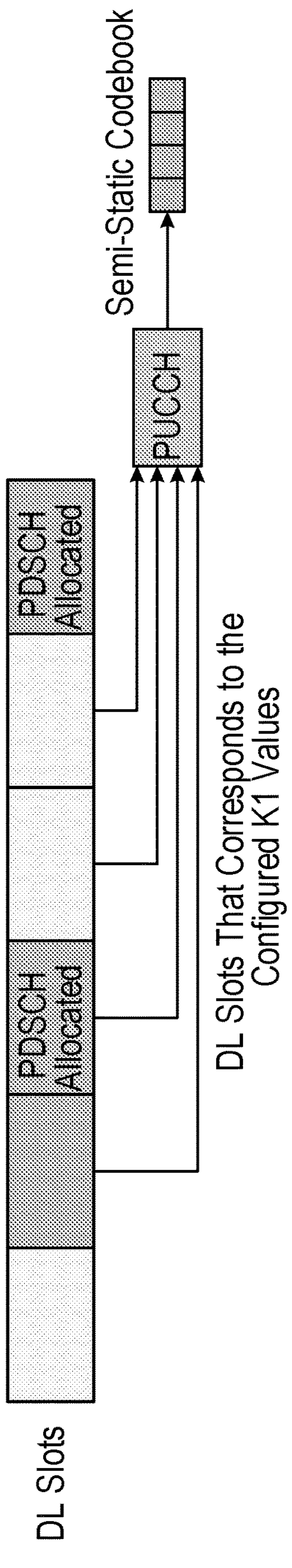
FIGS. 4A and 4B depicts examples of HARQ-ACK feedback, in accordance with certain aspects of the present disclosure.
Figure 4B:
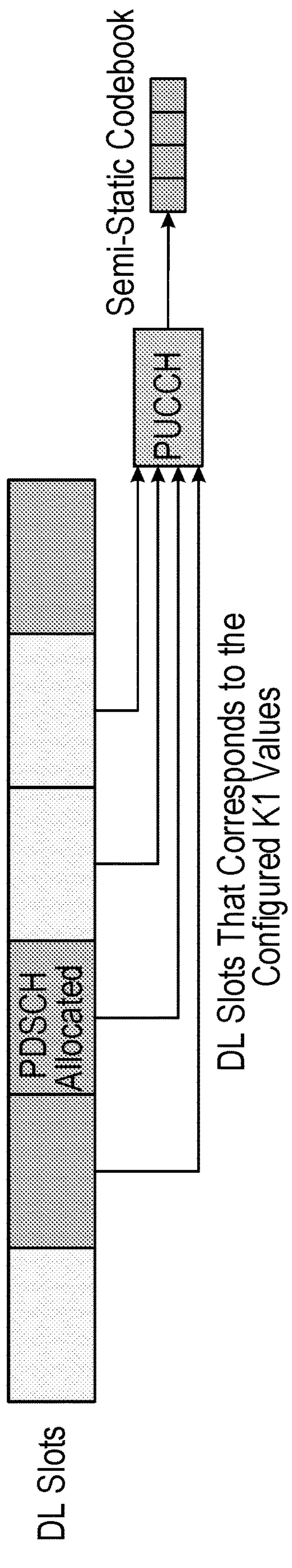

FIGS. 4A and 4B illustrates examples of Type-1 HARQ-ACK codebook based feedback. As shown, a semi-static HARQ-ACK codebook may be generated when scheduled PDSCH transmissions have different time-domain allocations (e.g., different start symbols and durations within a slot, determined by a SLIV (start-length-indicator) index value). In some systems (e.g., NR Release 15 and 16, hereinafter "Rel-15" and "Rel-16"), Type-1 HARQ-ACK codebook for PDSCH repetitions may be determined based on configurations of PDSCH aggregation factors (e.g., in SPS-Config or PDSCH-Config) and PDSCH time domain resource allocation (TDRA). The UE may report HARQ-ACK information for a PDSCH scheduled for reception in DL slot $n_D$ or in a HARQ-ACK codebook that the UE includes in a PUCCH or PUSCH transmission in slot n+k. Here, n is an UL slot overlapping with the end of the PDSCH reception in DL slot $n_D$ and k is a number of slots indicated by the PDSCH-to-HARQ_feedback timing indicator field.

In some systems (e.g., NR Release 17, hereinafter "Rel-17"), a UE may generate Type-1 HARQ-ACK codebook corresponding to DCI that can schedule multiple PDSCHs. The UE may determine the set of candidate PDSCH reception occasions corresponding to an UL slot allocated for HARQ-ACK transmission, based on a set of DL slots and a set of SLIVs corresponding to each DL slot in the set. For example, the set of DL slots may contain all the unique DL slots determined by considering all combinations of the configured slot timing values ($K_1$) and the configured rows (R) of the TDRA table. The set of SLIVs corresponding to a DL slot (referred to as belonging to the set of DL slots) may contain all the SLIVs for that slot. This set of SLIVs may be determined by considering all combinations of the configured HARQ-ACK feedback timing values (K1) and the configured rows of the TDRA table. The Rel-16 procedure may be reused for determining the candidate PDSCH reception occasions for the set of SLIVs corresponding to each DL slot belonging to the set. The Rel-16 procedure may also handle the pruning of multiple SLIVs corresponding to a DL slot, for both UEs that are capable of and UE that are not capable of receiving multiple PDSCHs per slot.

Figure 5:
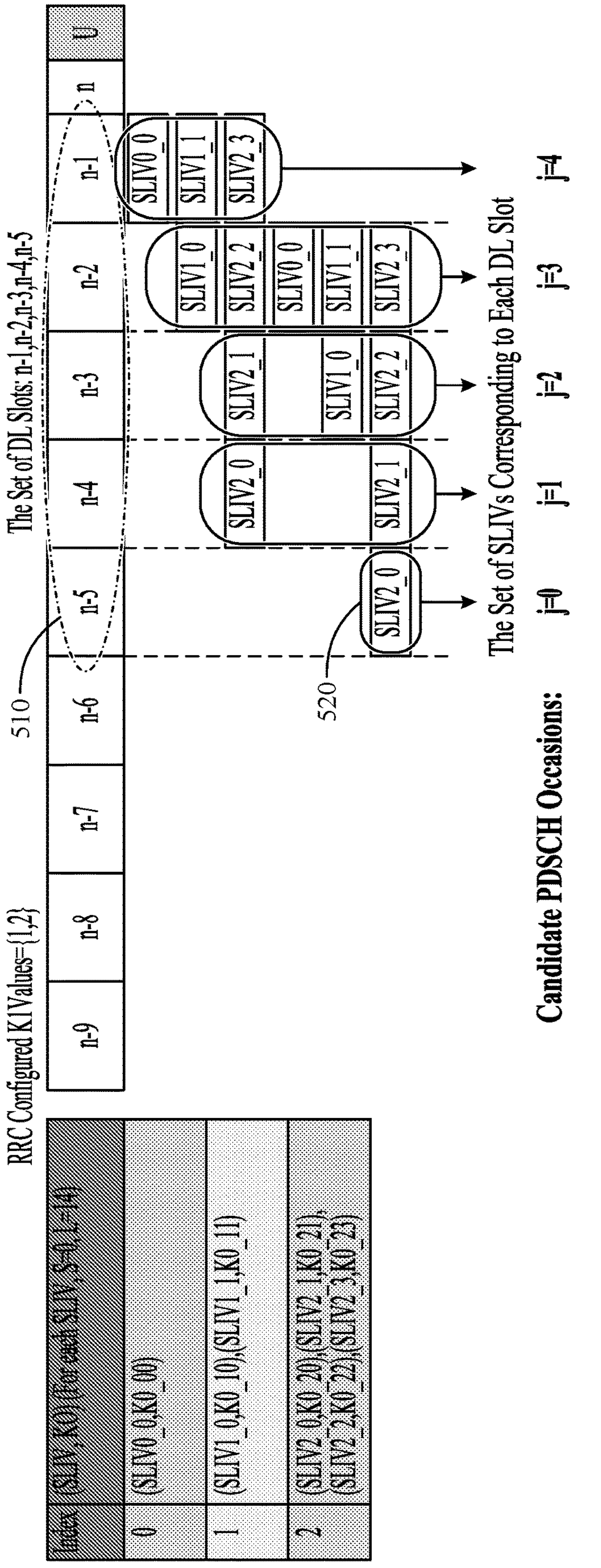
FIG. 5 depicts an example set of start and length indicator values (SLIVs) for a set of downlink (DL) slots, in accordance with certain aspects of the present disclosure.

FIG. 5 depicts an example for determining a set of SLIVs for a set of DL slots when different SLIVs belong to different DL slots, in accordance with certain aspects of the present disclosure. In this example, RRC configures the set of slot timing values $K_1$ to be {1, 2}. SLIVs are presented in the table. The UE determines the set of DL slots 510 from n−1 to n−5. The UE determines the set of SLIVs 520 corresponding to each DL slot as shown. For example, as shown, the set of SLIVs for slot n−5 includes only SLIV2_0. The set of SLIVs for slot n−4 includes SLIV2_0 and SLIV 2_1. The set of SLIVs for slot n−3 includes SLIV2_1, SLIV1_0, and SLIV2_2. The UE then determines a set of candidate PDSCH reception occasions j=0 through 4.

Figure 6:
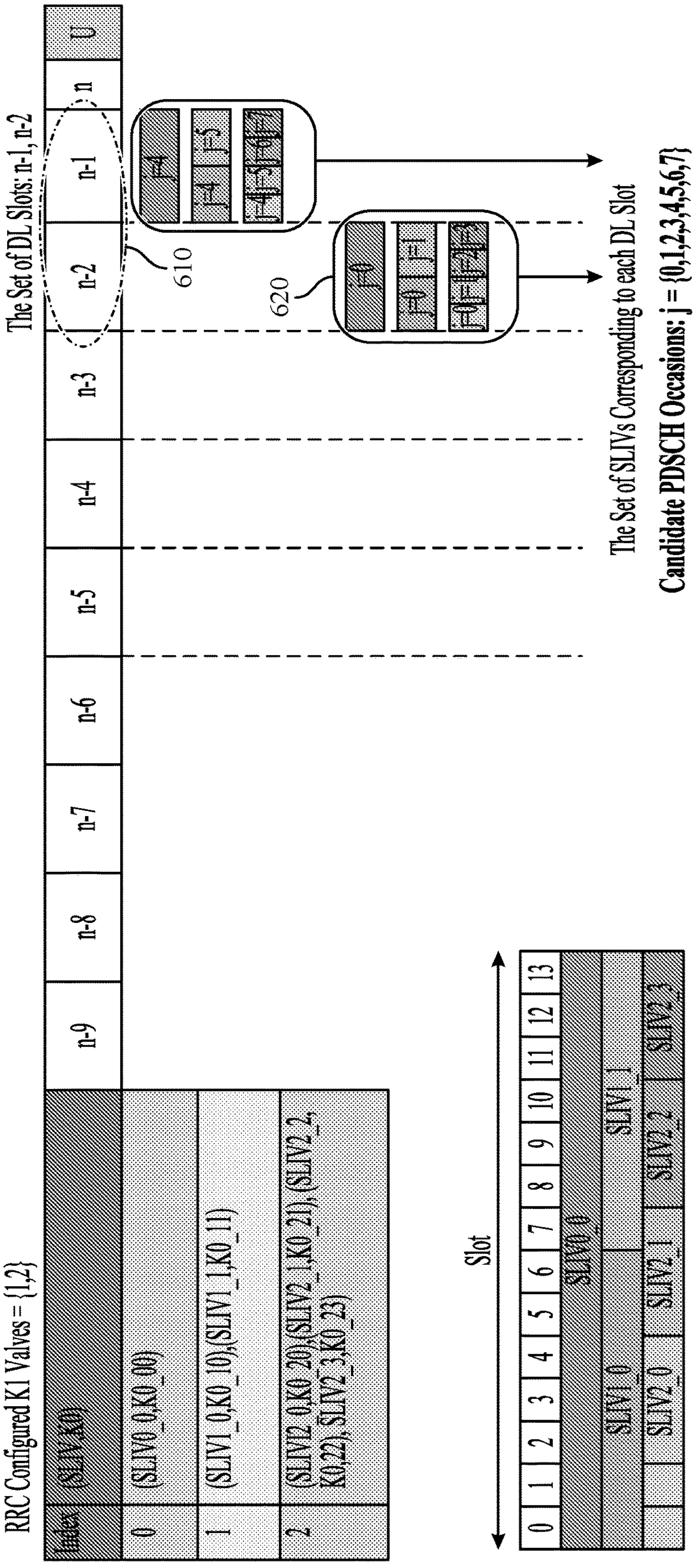
FIG. 6 depicts an example of a set of SLIVs for a set of DL slots, in accordance with certain aspects of the present disclosure.

FIG. 6 depicts an example for determining a set of SLIVs for a set of DL slots when different SLIVs belong to a same DL slot, in accordance with certain aspects of the present disclosure. In this example, different SLIVs may belong to the same DL slot as shown in the SLIV #_#per slot as shown. The set of DL slots 610 include n−1 and n−2. The UE determines the set of SLIVs 620, such as that slot n−2 includes the set of SLIVs 0_0 through 2_3, and slot n−1 includes the set of SLIVs 0_0 through 2_3, enlarged in the view on the bottom left. The UE then determines a set of candidate PDSCH repetition occasions j=0 through 7 based on the set of DL slots and the associated SLIVs.

For a DCI scheduling multiple PDSCHs, HARQ-ACK information corresponding to PDSCHs scheduled by the DCI is multiplexed (as uplink control information UCI) in a single PUCCH in a slot that is determined based on $K_1$. $K_1$ is a parameter that indicates the slot offset between the slot of the last PDSCH scheduled by the DCI and the slot carrying the HARQ-ACK information corresponding to the scheduled PDSCHs.

In aspects, if the number of UCI bits $O_{ACK}+O_{SR}+O_{CSI}\leq 11$, the UE determines a number of HARQ-ACK information bits $n_{HARQ\text{-}ACK}$ for obtaining a transmission power for a PUCCH, may be described as:

$$n_{HARQ\text{-}ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}$$

Here, $$N_{m,c}^{received}$$

is the number of transport blocks the UE receives in PDSCH reception occasion m for serving cell c if harq-ACK-SpatialBundlingPUCCH and PDSCH-CodeBlockGroupTransmission are not provided. Or $$N_{m,c}^{received}$$

is the number of transport blocks the UE receives in PDSCH reception occasion m for serving cell c if PDSCH-CodeBlockGroupTransmission is provided and the PDSCH reception is scheduled by a DCI format that does not support code block group (CBG) based PDSCH receptions, or the number of PDSCH receptions if harq-ACK-SpatialBundlingPUCCH is provided or SPS PDSCH release in PDSCH reception occasion m for serving cell c.

$$N_{m,c}^{received,CBG}$$

is the number of CBGs the UE receives in a PDSCH reception occasion m for serving cell c if PDSCH-CodeBlockGroupTransmission is provided, and the PDSCH reception is scheduled by a DCI format that supports CBG-based PDSCH receptions. The UE reports corresponding HARQ-ACK information in the PUCCH.

Therefore, a single candidate PDSCH reception occasion is generated for all repetitions $$\left(\text{e.g., } N_{PDSCH}^{repeat,max}\right),$$

according to Rel. 15 or 16. For Type-1 HARQ-ACK codebook determination, in some cases, only if all the $$N_{PDSCH}^{repeat,max}$$

repetitions overlap with UL symbols, the corresponding TDRA entry is removed from the set of TDRA rows (R). As discussed above, for multi-PDSCH scheduling in Rel. 17, a UE determines the set of candidate PDSCH reception occasions corresponding to an UL slot with HARQ-ACK transmission by determining a set of DL slots and the SLIVs therein. These techniques do not support a combination of multi-PDSCH scheduling and PDSCH repetitions. Aspects of the present disclosure may help address the issues for multi-PDSCH repetitions and provide various techniques for determining Type-1 HARQ-ACK codebook based on determining the set of candidate PDSCH reception occasions.

Aspects of Type-1 HARQ-ACK Codebook Determination for Multi-PDSCH Repetitions

Figure 7:
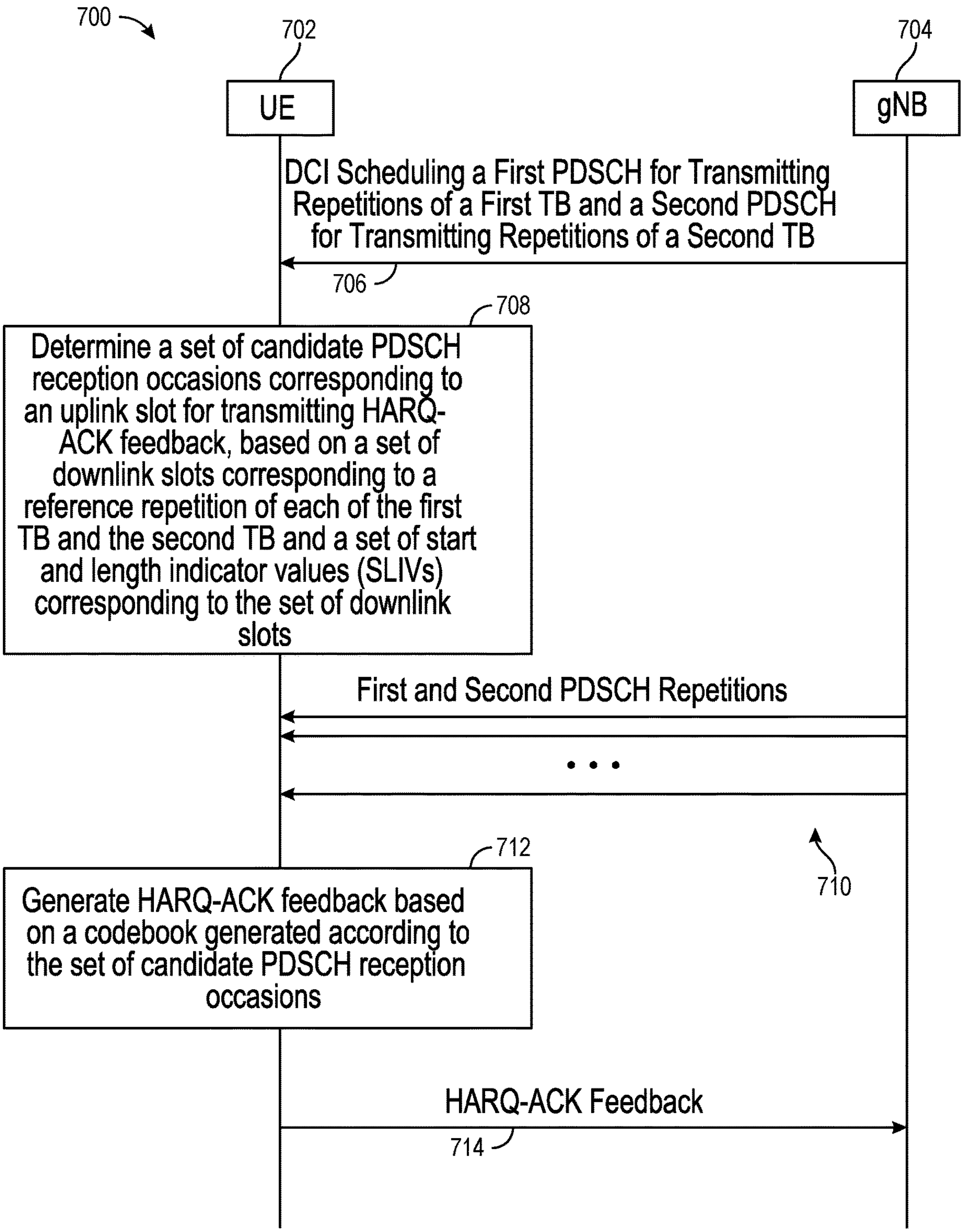
FIG. 7 depicts a call flow diagram between a user equipment (UE) and a serving network, in accordance with certain aspects of the present disclosure.

FIG. 7 depicts a call flow diagram 700 between a user equipment (UE) 702 and a gNB 704, in accordance with certain aspects of the present disclosure.

The gNB 704 transmits, at 706, a DCI to the UE 702. The DCI schedules a first PDSCH for transmitting repetitions of a first transport block (TB) and a second PDSCH for transmitting repetitions of a second TB.

Upon receiving the DCI, at 708, the UE determines a set of candidate PDSCH repetition occasions corresponding to an uplink slot for transmitting HARQ-ACK feedback, based on a set of DL slots corresponding to a reference repetition of each of the first TB and the second TB, and a set of SLIVs corresponding to the set of DL slots. As further discussed below, determining the set of candidate PDSCH repetition occasions may depend on different assumptions and/or configurations. The reference repetition may be different in different implementations or corresponding to the different assumptions, such as every repetition, or a last repetition, etc.

At 710, the gNB transmits the first PDSCH and the second PDSCH repetitions of the first TB and the second TB to the UE. The UE monitors for repetitions of the first PDSCH and the second PDSCH in the set of candidate PDSCH reception occasions determined at 708.

At 712, the UE generates HARQ-ACK feedback based on a codebook generated according to the set of candidate PDSCH reception occasions. At 714, the UE transmits HARQ-ACK feedback indicating results of the monitoring. Details of different options and methods are explained with reference to FIGS. 8-18. The different options and methods may be implemented in view of various different assumptions and use cases.

For example, in some cases, a same number of repetitions are applied for all TBs and the number of repetitions are configured by RRC. In some cases, the same number of repetitions are applied for all TBs and the number of repetitions are configured in TDRA table and indicated by the TDRA field in DCI. In some cases, different number of repetitions are applied for different TBs and the number of repetitions for each TB are configured in TDRA table and indicated by the TDRA field in DCI. In some cases, each repetition of each TB has its own SLIV. The techniques of the present disclosure may be adjusted for these different cases or assumptions.

According to a first aspect of the present disclosure, the set of candidate PDSCH reception occasions corresponding to an UL slot with HARQ-ACK transmission is determined based on a set of DL slots and a set of SLIVs corresponding to each DL slot belonging to the set of DL slots. This allows for enhancements of generating type-1 HARQ-ACK codebook corresponding to DCI that schedules multiple PDSCHs each with multiple repetitions. In particular, the set of DL slots may contain all the unique DL slots corresponding to the last repetition of each TB determined by considering all combinations of the configured HARQ-ACK feedback timing values (K1) and the configured rows (R) of the TDRA table. The set of SLIVs corresponding to a DL slot (belonging to the set of DL slots) contains all the SLIVs corresponding to the last repetition for that slot determined by considering all combinations of the configured HARQ-ACK feedback timing values (K1) and the configured rows (R) of the TDRA table.

In some cases, different options may be implemented for determining the candidate PDSCH reception occasions for the set of SLIVs corresponding to each DL slot belonging to the set of DL slots. For example, in a first option, for each SLIV (belonging to the set of SLIVs) corresponding to a DL slot, the UE may check if each repetition of a TB associated with this SLIV overlaps with at least one UL symbol, if so, the UE removes corresponding SLIV from the set of SLIVs.

In a second option, for each SLIV (belonging to the set of SLIVs) corresponding to a DL slot, the UE may check if the last repetition of a TB associated with this SLIV overlaps with at least one UL symbol, if so, the UE removes the corresponding SLIV from the set of SLIVs.

In a third option, for TBs except the last TB and for each SLIV (belonging to the set of SLIVs) corresponding to a DL slot, the UE may check if all the repetitions of a TB associated with this SLIV overlap with at least one UL symbol, if so, the UE removes (or prunes) the corresponding SLIV from the set of SLIVs. For the last TB, the UE may check if the last repetition of the TB associated with this SLIV overlaps with at least one UL symbol, if so, the UE removes the corresponding SLIV from the set of SLIVs.

Figure 8:
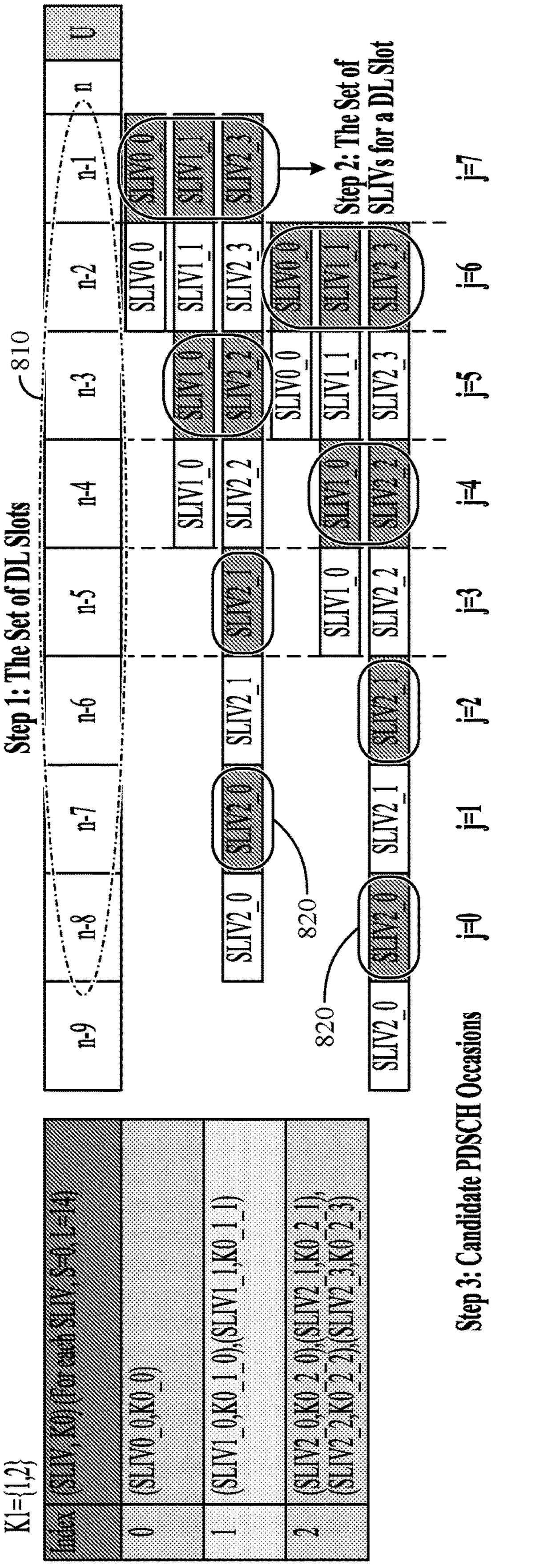
FIG. 8, FIG. 9, FIG. 10, FIG. 11, FIG. 12, FIG. 13, FIG. 14, FIG. 15, FIG. 16, and FIG. 17 depict examples of how to determine a set of SLIVs for a set of DL slots for multi-PDSCH repetitions, in accordance with certain aspects of the present disclosure.

The multiple SLIVs corresponding to a DL slot may then be further pruned (e.g., a portion removed) according to certain rules (e.g., Rel-16), for UEs that are capable of receiving multiple PDSCHs per slot as well as for UEs that are not capable of receiving multiple PDSCHs per slot. These operations may be repeated for each DL slot belonging to the set of DL slots FIG. 8 depicts an example for determining a set of SLIVs for a set of DL slots for multi-PDSCH repetitions assuming different SLIVs belong to different DL slots, in accordance with certain aspects of the present disclosure. In the illustrated example, as shown in the table on the left, it is assumed that the number of repetitions configured by RRC is two and that the configured HARQ-ACK feedback timing value K1 is 1 or 2 (K1={1, 2}). Further, different SLIVs may belong to different DL slots, and there is inter-slot repetition for each TB. As shown in the slots "n−9" through "n," the last slot "n" is an uplink slot "U."

For determining the set of candidate PDSCH reception occasions, the UE first determines the set of DL slots 810 (slots n−8, n−7, . . . , n−1). Then, the UE determines the set of SLIVs 820 for each DL slot. As shown, the set of SLIVs are corresponding to the SLIVs associated with last repetition of each TB. The UE then removes (or prunes) one or more SLIVs in each DL slot belonging to the set of DL slots, while keeping the circled slots 820 as shown.

Based on the set of DL slots and the set of SLIVs for each DL slot, the UE determines the candidate PDSCH occasions j=0, j=1, . . . j=7, according to certain rules. For example, for each SLIV (belonging to the set of SLIVs) in a DL slot, the UE may check whether each repetition associated with this SLIV is overlapped with an UL symbol, if so, the UE removes this SLIV for the DL slot.

As shown in FIG. 8, for slot n−1, there are three SLIVs corresponding to the last repetition. For SLIV0_0, the UE checks whether SLIV0_0 in each of slot n−2 and slot n−1 are overlapped with at least one UL symbol. If yes, the UE removes SLIV0_0 from the set of SLIVs. For SLIV 1_1, the UE checks whether SLIV1_1 in each of slot n−2 and slot n−1 are overlapped with at least one UL symbol. If yes, the UE removes SLIV1_1 from the set of SLIVs in slot n−2. The same procedure is used for SLIV 2_3. For the remaining SLIVs, the UE determines the candidate PDSCH occasions based on the rules in Rel. 15 or 16. These procedures may be repeated for each DL slot in the set of DL slots.

Figure 9:
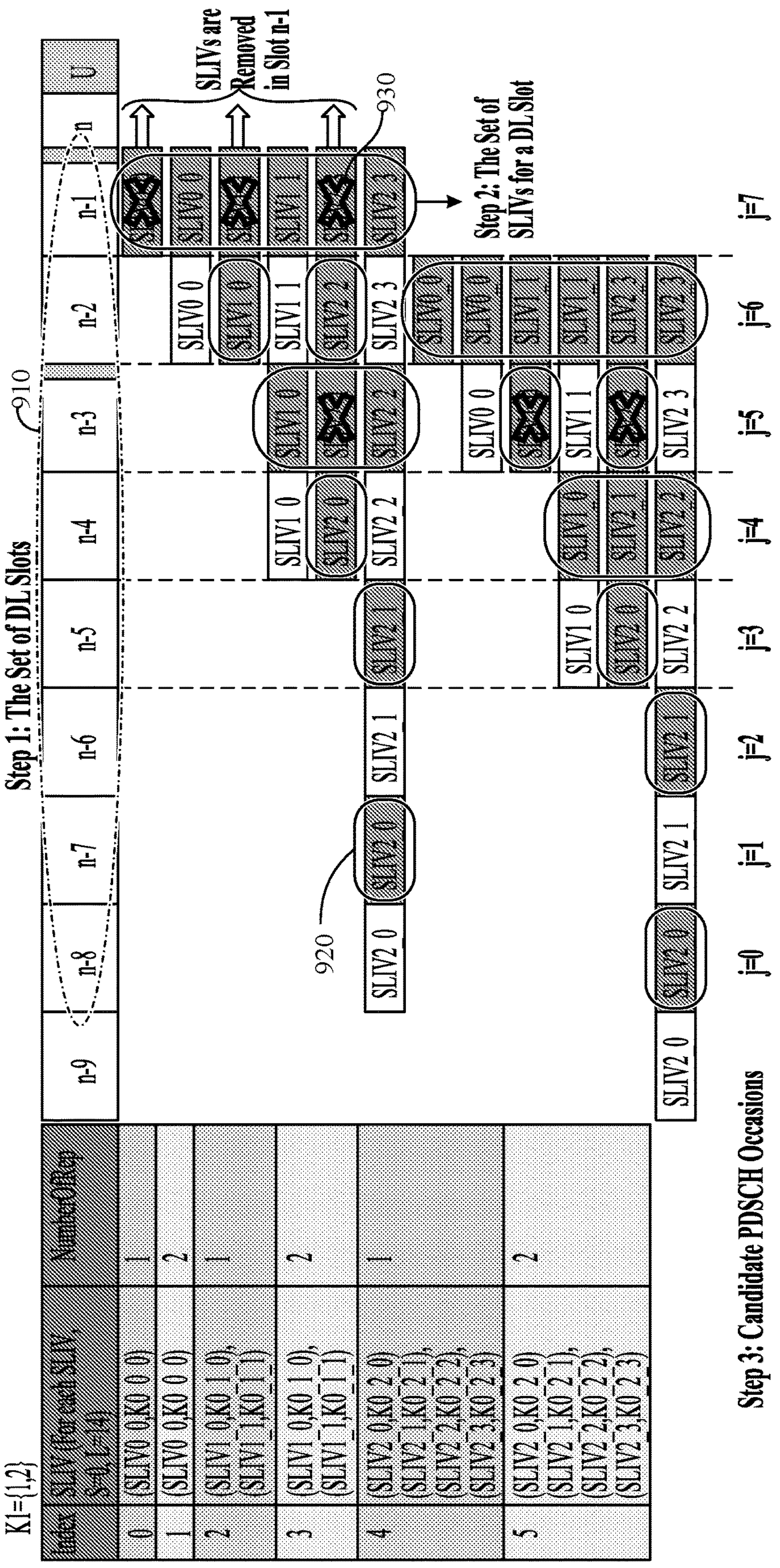

FIG. 9 depicts an example for determining a set of SLIVs for a set of DL slots for multi-PDSCH repetitions when different SLIVs belong to different DL slots and overlap with uplink (UL) symbols, in accordance with certain aspects of the present disclosure.

This example corresponds to the first option of the first aspect discussed above. That is, for each SLIV (belonging to the set of SLIVs) corresponding to a DL slot, the UE may check if each (every) repetition of a TB associated with this SLIV overlaps with at least one UL symbol, if so, the UE removes corresponding SLIV from the set of SLIVs. In this example, it is assumed that different SLIVs may belong to different DL slots and there is inter-slot repetition for each TB. A set of SLIVs is shown in the table on the left of FIG. 9.

For determining the set of candidate PDSCH reception occasions, the UE first determines the set of DL slots 910 (slots n−8, n−7, . . . , n−1). As shown, slots n−3 and n−1 respectively overlap with an UL symbol. Then, the UE determines the set of SLIVs 920 for each DL slot. As shown, the set of SLIVs are selected from the SLIVs in the table on the left and are corresponding to the SLIVs associated with last repetition of each TB.

For each SLIV (belonging to the set of SLIVs) in a DL slot, the UE checks the following condition: whether every repetition associated with this SLIV is overlapped with at least one UL symbol. If so (i.e., the condition is satisfied), the UE removes this SLIV for the DL slot.

Turning first to slot n−1 shown in FIG. 9, because SLIV0_0 of the first row corresponds to one and only one repetition of TB that overlaps with an UL symbol, the SLIV0_0 at slot n−1 is removed (indicated by the removal marker 930). However, for the second row, where there are two repetitions of the SLIV0_0, the first repetition corresponds to the slot n−2, which does not overlap with any UL symbol. As such, the condition that every repetition associated with this SLIV in a DL slot is not satisfied. Therefore, the SLIV0_0 corresponding to the repetition of TB for slot n−1, even though overlapping with an UL symbol, is not removed. This pruning process is carried out for each repetition associated with the set of SLIVs corresponding to the DL slots. Based on the set of DL slots and the set of SLIVs for each DL slot, the UE then determines the candidate PDSCH occasions j=0, j=1, . . . j=7.

Figure 10:
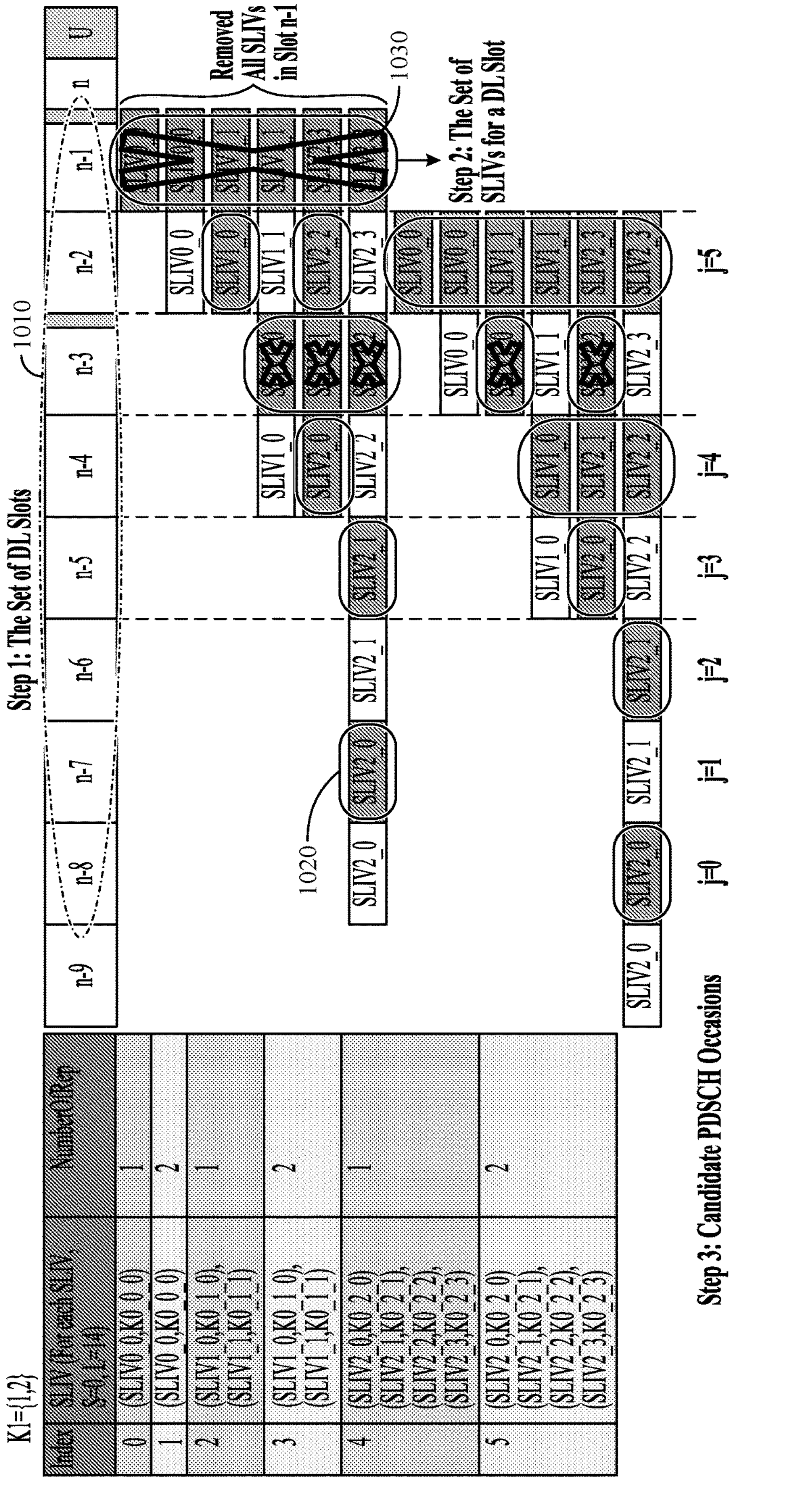

FIG. 10 depicts another example for determining a set of SLIVs for a set of DL slots for multi-PDSCH repetitions when different SLIVs belong to different DL slots and overlap with UL symbols, in accordance with certain aspects of the present disclosure.

This example corresponds to the second option of the first aspect discussed above. That is, for each SLIV (belonging to the set of SLIVs) corresponding to a DL slot, the UE may check if the last repetition of a TB associated with this SLIV overlaps with at least one UL symbol, if so, the UE removes corresponding SLIV from the set of SLIVs. This example shares the same assumption as the example of FIG. 9 (e.g., that different SLIVs may belong to different DL slots and there is inter-slot repetition for each TB).

For determining the set of candidate PDSCH reception occasions, the UE first determines the set of DL slots 1010 (slots n−8, n−7, . . . , n−1). As shown, slots n−3 and n−1 respectively include an UL symbol. Then, the UE determines the set of SLIVs 1020 for each DL slot. As shown, the set of SLIVs are selected from the SLIVs in the table on the left and are corresponding to the SLIVs associated with last repetition of each TB. For each SLIV (belonging to the set of SLIVs) in a DL slot, the UE checks the following condition: whether the last repetition associated with this SLIV is overlapped with an UL symbol. If so, the UE removes this SLIV for the DL slot.

Turning first to slot n−1 shown in FIG. 10, because all repetitions in the rows 1-6 satisfy the condition, that the last repetitions associated with respective SLIVs overlap with an UL symbol, the SLIVs in slot n−1 are removed (indicated by the removal marker 1030). Similar procedure is carried out for the slot n−3, in rows 4-6, where the condition is satisfied and the SLIVs in slot n−3, rows 4-6 are removed.

However, for the rows 8, 10, and 12 in slot n−2, where there are two repetitions of the respective SLIVs (SLIV0_0, SLIV1_1, and SLIV2_3), the condition is not satisfied. That is the last repetitions associated with the SLIVs (in slot n−2) do not overlap with any UL symbol. As such, the SLIVs in slot n−2 and rows 8, 10, and 12 are not removed. This pruning process is carried out for each repetition associated with the set of SLIVs corresponding to the DL slots. Based on the set of DL slots and the set of SLIVs for each DL slot, the UE then determines the candidate PDSCH occasions j=0, j=1, . . . j=5.

Figure 11:
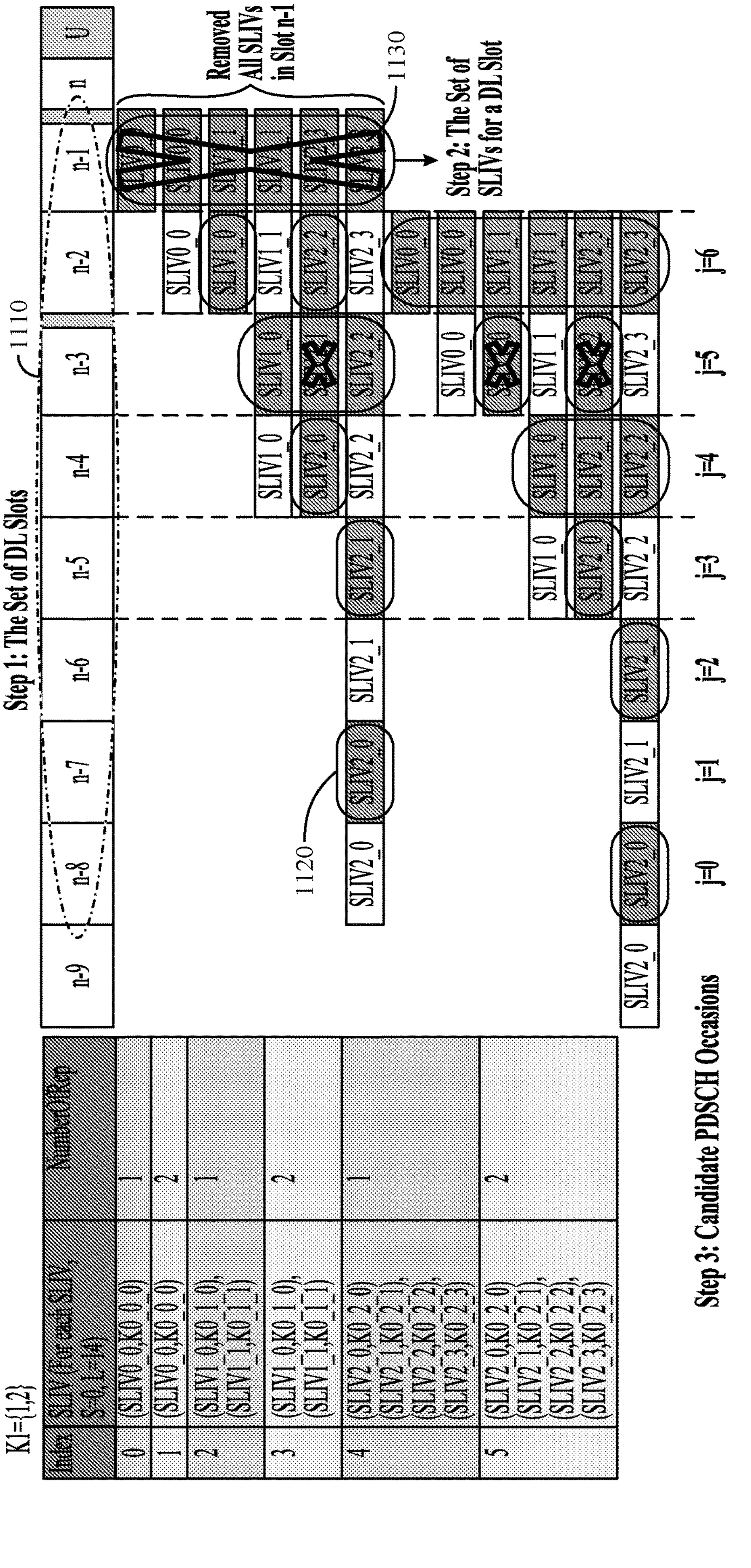

FIG. 11 depicts another example for determining a set of SLIVs for a set of DL slots for multi-PDSCH repetitions when different SLIVs belong to different DL slots and overlap with UL symbols, in accordance with certain aspects of the present disclosure.

This example corresponds to the third option of the first aspect discussed above. That is, for TBs except the last TB and for each SLIV (belonging to the set of SLIVs) corresponding to a DL slot, the UE may check if all the repetitions of a TB associated with this SLIV overlap with at least one UL symbol, if so, the UE removes the corresponding SLIV from the set of SLIVs. For the last TB, the UE may check if the last repetition of the TB associated with this SLIV overlaps with UL symbol, if so, the UE removes the corresponding SLIV from the set of SLIVs. This example shares the same assumption as the example of FIG. 9. It is assumed that different SLIVs may belong to different DL slots and there is inter-slot repetition for each TB.

For determining the set of candidate PDSCH reception occasions, the UE first determines the set of DL slots 1110 (slots n−8, n−7, . . . , n−1). As shown, slots n−3 and n−1 respectively include an UL symbol. Then, the UE determines the set of SLIVs 1120 for each DL slot. As shown, the set of SLIVs are selected from the SLIVs in the table on the left and are corresponding to the SLIVs associated with last repetition of each TB. For each SLIV (belonging to the set of SLIVs) in a DL slot, the UE checks the following condition: for TBs except the last TB, whether each/every repetition associated with this SLIV is overlapped with an UL symbol, if so, the UE removes this SLIV for the DL slot. For the last TB, the UE checks whether the last repetition associated with this SLIV is overlapped with UL symbol, if so, the UE removes this SLIV from the DL slot.

Turning first to slot n−1 as shown in FIG. 11, because all repetitions in the rows 1-6 satisfy the condition regarding the last TB, that the last repetitions associated with respective SLIVs overlap with an UL symbol, the SLIVs in slot n−1 are removed (indicated by the removal marker 1130). For the slot n−3, however, the UE checks whether every repetition associated with the SLIV overlaps with an UL symbol. For rows 4 and 6, there are two repetitions of the respective SLIVs (SLIV1_0 at row 4, and SLIV2_2 at row 6), the condition is not satisfied. Therefore, the SLIVs associated with repetitions at rows 4 and 6 in slot n−3 are not removed. For rows 5, 9 and 11, there are single repetition of the respective SLIVs (SLIV 2_1 at row 5, SLIV 1_0 at row 9 and SLIV 2_2 at row 11), the condition is satisfied. Therefore, the SLIVs 2_1, 1_0 and 2_2 in slot n−3 are removed. This pruning process is carried out for each repetition associated with the set of SLIVs corresponding to the DL slots. Based on the set of DL slots and the set of SLIVs for each DL slot, the UE then determines the candidate PDSCH occasions j=0, j=1, . . . j=6.

Figure 12:
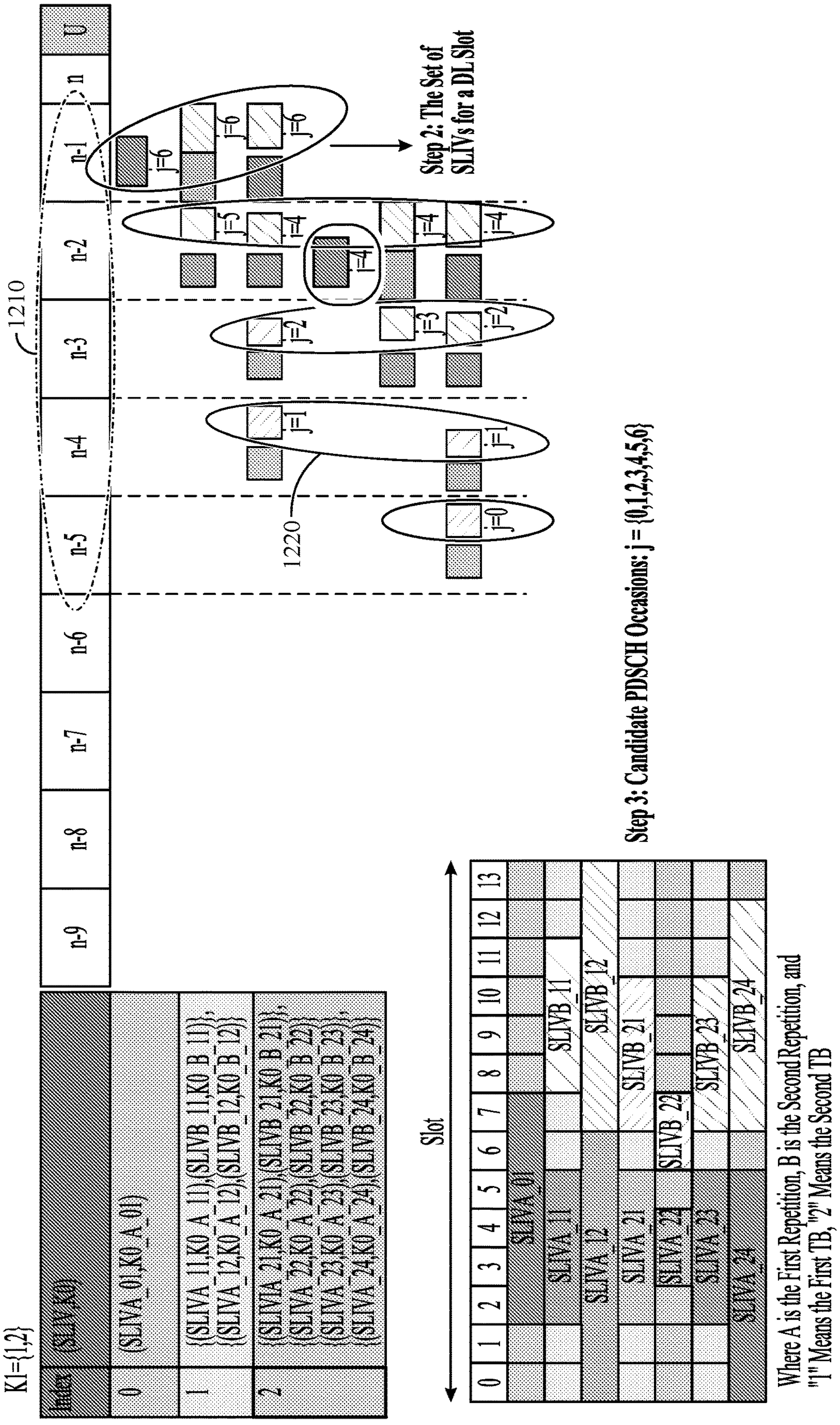

FIG. 12 depicts an example for determining a set of SLIVs for a set of DL slots for multi-PDSCH repetitions when each repetition of each transport block (TB) has a respective SLIV and slot timing value (e.g., different SLIVs belong to a same DL slot), in accordance with certain aspects of the present disclosure. In this example, it is assumed that each repetition of a TB has its own SLIV and K0 (referring to the table on the left of FIG. 12).

For determining the set of candidate PDSCH reception occasions, the UE first determines the set of DL slots 1210 (slots n−5, n−4, . . . , n−1). Then, the UE determines the set of SLIVs 1220 for each DL slot. As shown, the set of SLIVs are selected from the SLIVs (e.g., SLIVA_11) in the table and are corresponding to the SLIVs associated with the last repetition of each TB, where A indicates the first repetition and B the second repetition. The numeric subscripts “1” indicates the first TB, and “2” indicates the second TB. The UE determines the set of candidate PDSCH occasions: j={0, 1, 2, 3, 4, 5, 6} based on the set of DL slots 1210 and the set of SLIVs 1220.

In a second aspect, the UE may again determine the set of candidate PDSCH reception occasions corresponding to an UL slot with HARQ-ACK transmission based on a set of DL slots and a set of SLIVs corresponding to each DL slot belonging to the set of DL slots. Compared to the first aspect, the set of DL slots may correspond to the first repetition of each TB (instead of the last repetition). For example, the set of DL slots contains all the unique DL slots corresponding to the first repetition of each TB determined by considering all combinations of the configured HARQ-ACK feedback timing values (K1) and the configured rows of the TDRA table. The set of SLIVs corresponding to a DL slot (belonging to the set of DL slots) contains all the SLIVs corresponding to the first repetition for that slot determined by considering all combinations of the configured HARQ-ACK feedback timing values (K1) and the configured rows of the TDRA table.

Similar to the first aspect, different options may be implemented for determining the candidate PDSCH reception occasions for the set of SLIVs corresponding to each DL slot belonging to the set of DL slots. For example, in a first option, for each SLIV (belonging to the set of SLIVs) corresponding to a DL slot, the UE may check if each repetition of a TB associated with this SLIV overlaps with at least one UL symbol, if so, the UE removes corresponding SLIV from the set of SLIVs.

In a second option, for each SLIV (belonging to the set of SLIVs) corresponding to a DL slot, the UE may check if the last repetition of a TB associated with this SLIV overlaps with at least one UL symbol, if so, the UE removes the corresponding SLIV from the set of SLIVs.

In a third option, for TBs except the last TB and for each SLIV (belonging to the set of SLIVs) corresponding to a DL slot, the UE may check if all the repetitions of a TB associated with this SLIV overlap with at least one UL symbol, if so, the UE removes the corresponding SLIV from the set of SLIVs. For the last TB, the UE may check if the last repetition of the TB associated with this SLIV overlaps with at least one UL symbol, if so, the UE removes the corresponding SLIV from the set of SLIVs. The multiple SLIVs corresponding to a DL slot may then be further pruned (e.g., a portion removed) according to certain rules (e.g., Rel-16), for UEs that are capable of receiving multiple PDSCHs per slot as well as for UEs that are not capable of receiving multiple PDSCHs per slot. These operations may be repeated for each DL slot belonging to the set of DL slots.

Figure 13:
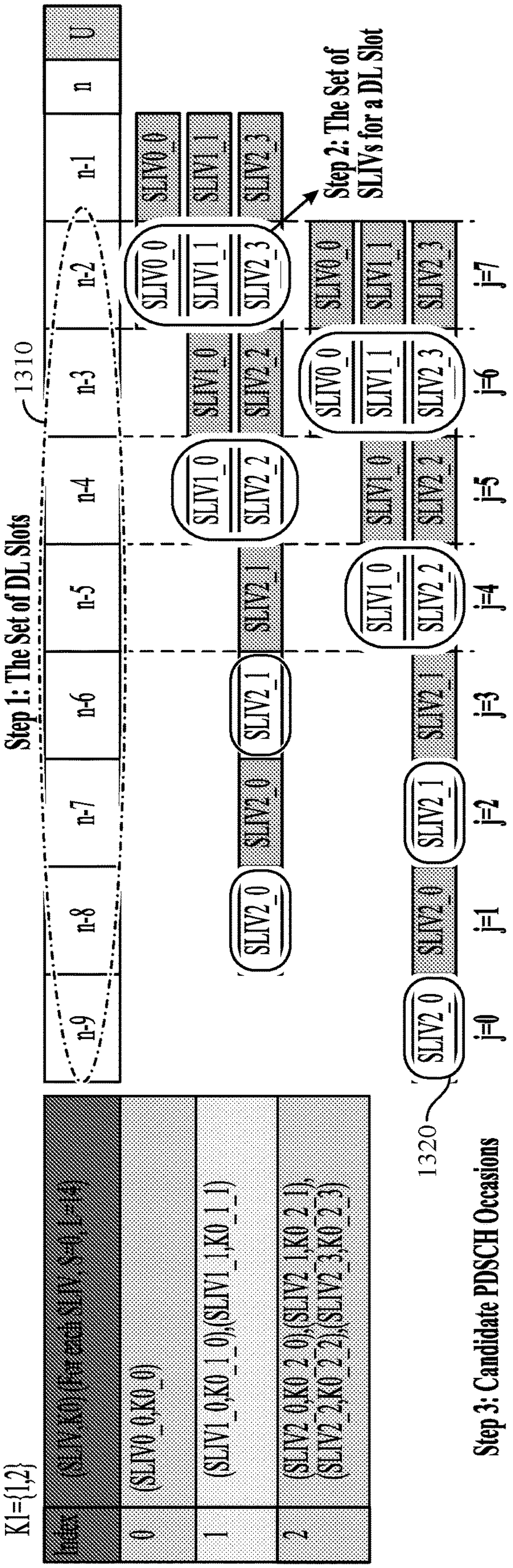

FIG. 13 depicts an example for determining a set of SLIVs for a set of DL slots for multi-PDSCH repetitions when different SLIVs belong to different DL slots, in accordance with certain aspects of the present disclosure. This example corresponds to the second aspect. In this example, it is assumed that the number of repetitions (2 in this example) is constant (e.g., fixed) or configured by RRC. Different SLIVs may belong to different DL slot. There is inter-slot repetition for each TB.

For determining the set of candidate PDSCH reception occasions, the UE first determines the set of DL slots 1310 (slots n−9, n−8, . . . , n−2). Then, the UE determines the set of SLIVs 1320 for each DL slot. As shown, the SLIVs in the set are selected from the SLIVs in the table and are corresponding to the SLIVs associated with the first repetition of each TB. The UE performs pruning of multiple SLIVs in each DL slot belonging to the set of DL slots to determine the candidate PDSCH occasions. For example, for each SLIV (belonging to the set of SLIVs) in a DL slot, the UE checks whether all the repetitions associated with this SLIV are overlapped with at least one UL symbol. If so, the UE removes this SLIV for the DL slot.

As shown, for slot n−2, there are three SLIVs corresponding to the first repetition. For SLIV0_0, the UE checks whether SLIV0_0 in each of slot n−2 and slot n−1 are overlapped with UL symbol. If yes (not shown), the UE may remove SLIV0_0 from the set of SLIVs. Similarly, for SLIV 1_1, the UE checks whether SLIV1_1 in each of slot n−2 and slot n−1 are overlapped with UL symbol. If yes (not shown), the UE may remove SLIV1_1 from the set of SLIVs in slot n−2. The same checking procedure may be performed for SLIV 2_3. For the remaining SLIVs, the UE determines the candidate PDSCH occasion based on the rules in Rel.15/ Rel.16. The UE repeats these procedures for each DL slot in the set of DL slots.

The UE then determines the set of candidate PDSCH occasions (e.g., j={0, 1, 2, 3, 4, 5, 6, 7}) based on the set of DL slots 1310 and the set of SLIVs 1320.

Figure 14:
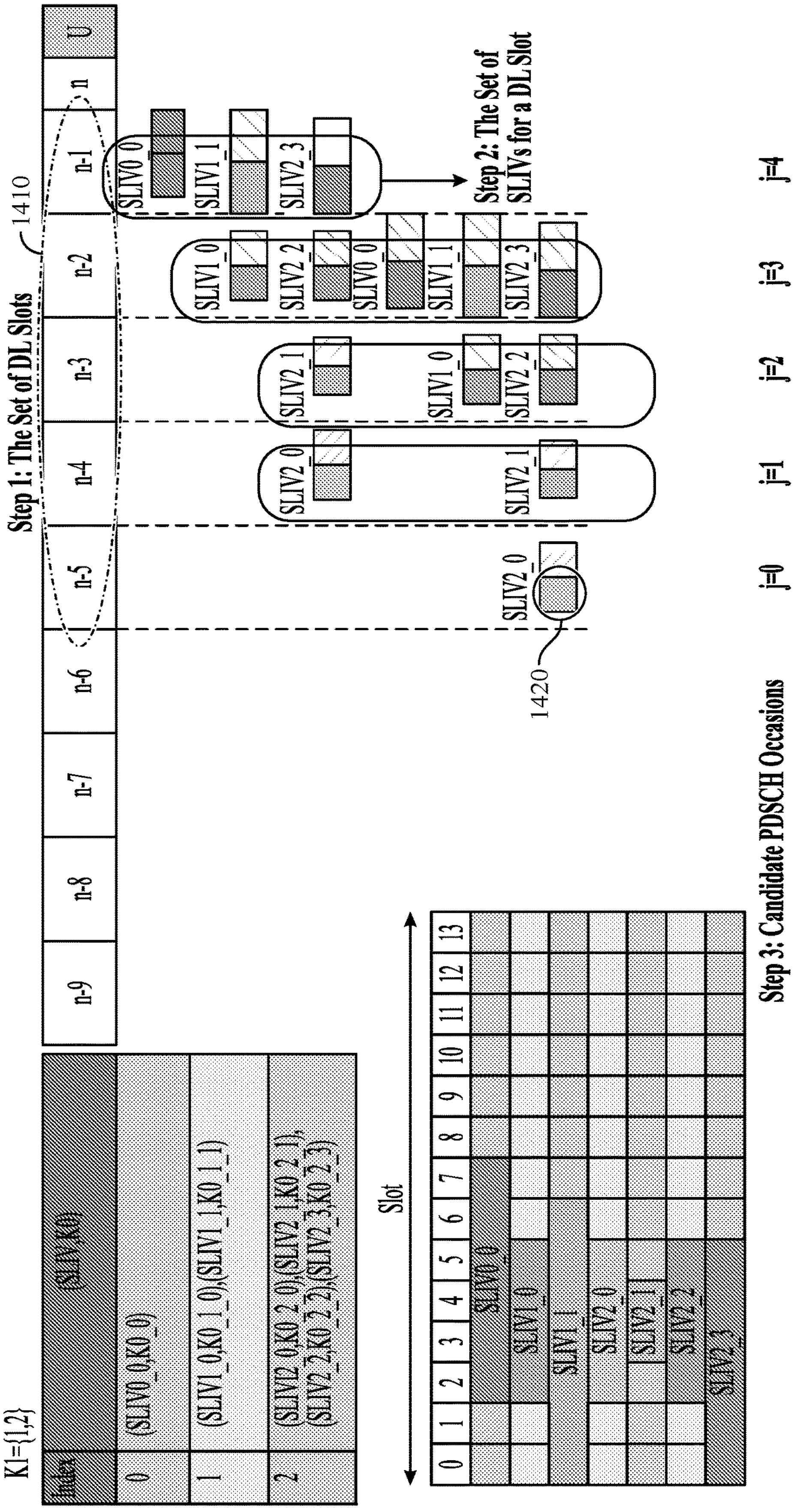

FIG. 14 depicts an example for determining a set of SLIVs for a set of DL slots for multi-PDSCH repetitions when different SLIVs belong to different DL slots, in accordance with certain aspects of the present disclosure. In this example, it is assumed that the number of repetitions (that is fixed or configured by RRC) is two. It is further assumed that different SLIVs belong to different DL slots. There is intra-slot repetition (with gap 0) for each TB. This example corresponds to the second aspect.

For determining the set of candidate PDSCH reception occasions, the UE first determines the set of DL slots 1410 (slots n−5, n−4, . . . , n−1). Then, the UE determines the set of SLIVs 1420 for each DL slot. As shown, the SLIVs in the set are selected from the SLIVs in the table and are corresponding to the SLIVs associated with the first repetition of each TB. The UE performs pruning of multiple SLIVs in each DL slot belonging to the set of DL slots to determine the candidate PDSCH occasions. The UE then determines the set of candidate PDSCH occasions (e.g., j={0, 1, 2, 3, 4}) based on the set of DL slots 1410 and the set of SLIVs 1420.

Figure 15:
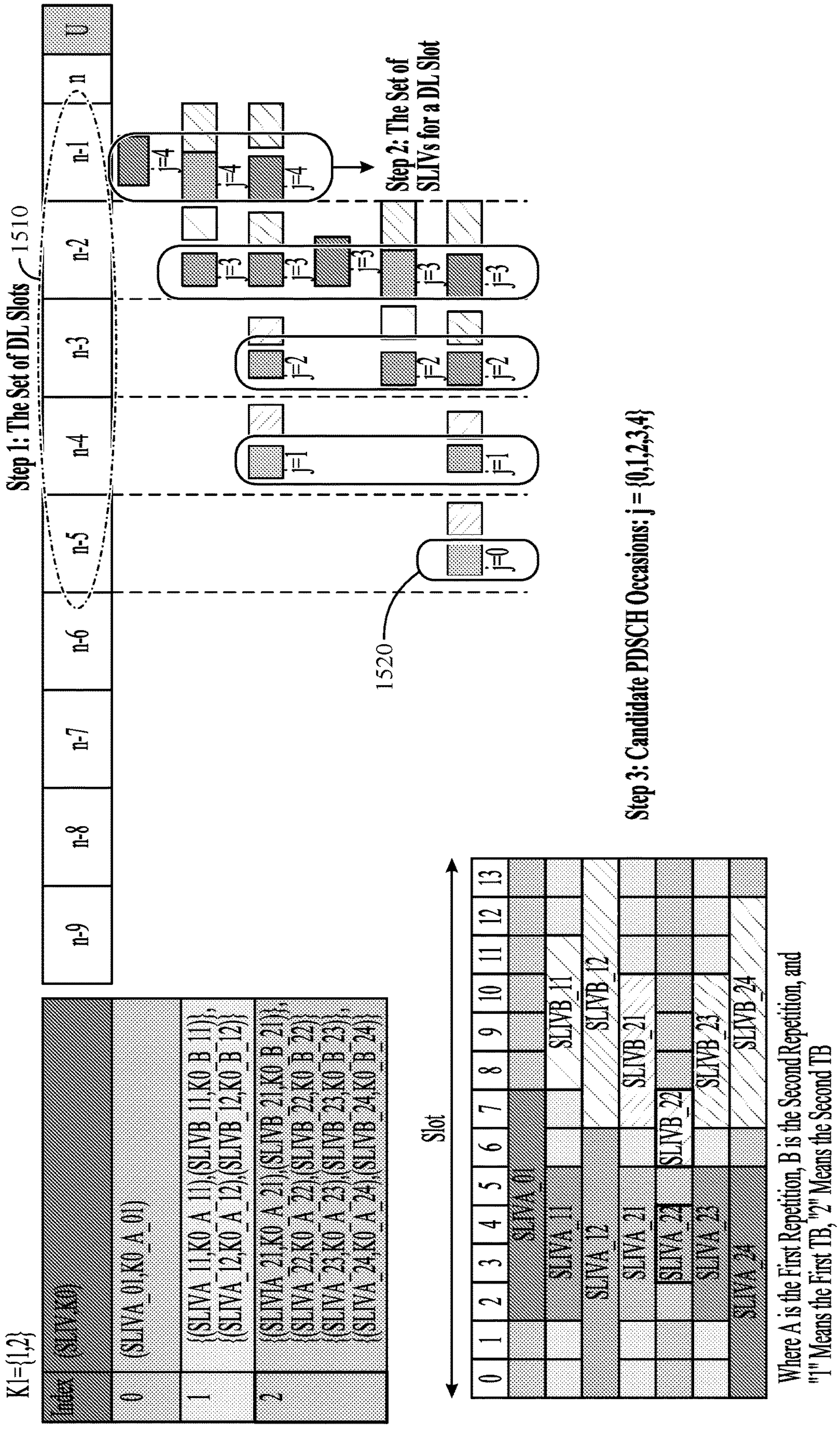

FIG. 15 depicts an example for determining a set of SLIVs for a set of DL slots for multi-PDSCH repetitions when each repetition of each TB includes a respective SLIV and slot timing value, in accordance with certain aspects of the present disclosure. In this example, it is assumed that each repetition of each TB has its own SLIV and K0 (referring to the table on the left of FIG. 15).

For determining the set of candidate PDSCH reception occasions, the LIE first determines the set of DL slots 1510 (slots n−5, n−4, . . . , n−1). Then, the LIE determines the set of SLIVs 1520 for each DL slot. As shown, the set of SLIVs are selected from the SLIVs (e.g., SLIVA_11) in the table and are corresponding to the SLIVs associated with the first repetition of each TB, where A indicates the first repetition and B the second repetition. The numeric subscripts "1" indicates the first TB, and "2" indicates the second TB. The UE determines the set of candidate PDSCH occasions (e.g., j={0, 1, 2, 3, 4}) based on the set of DL slots 1510 and the set of SLIVs 1520.

Figure 16:
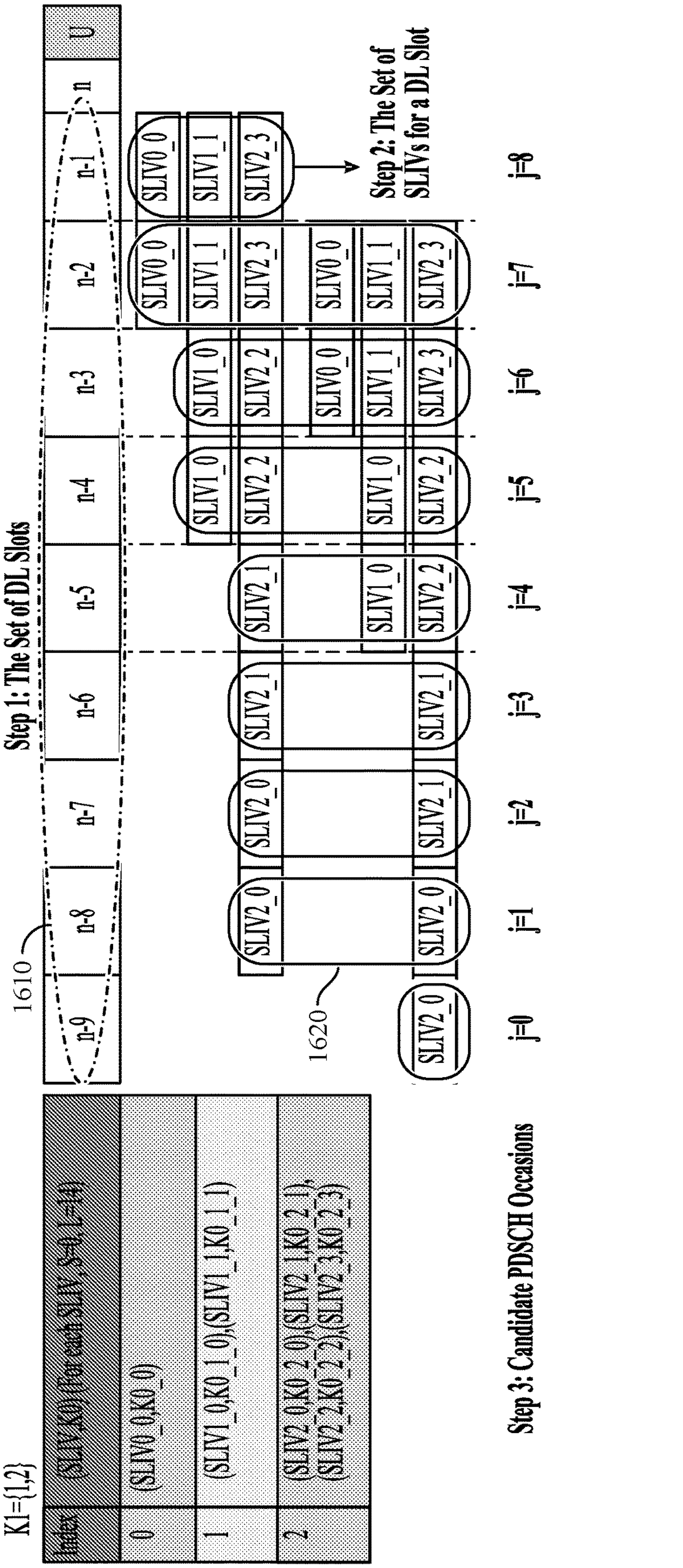

In a third aspect, the UE may determine the set of candidate PDSCH reception occasions corresponding to an UL slot with HARQ-ACK transmission based on a set of DL slots and a set of SLIVs corresponding to each DL slot belonging to the set of DL slots. Comparing to the first or the second aspects, instead of using the last or the first repetition of each TB, the third aspect determines a set of DL slots contains all the unique DL slots corresponding to any repetition of each TB determined by considering all combinations of the configured HARQ-ACK feedback timing values (K1) and the configured rows of the TDRA table. The UE may determine the set of SLIVs corresponding to a DL slot (belonging to the set of DL slots) contains all the SLIVs corresponding to any repetition of each TB for that slot determined by considering all combinations of the configured HARQ-ACK feedback timing values (K1) and the configured rows of the TDRA table. Similar to the first and the second aspects, a standard procedure (e.g., Rel-16) may be used for determining the candidate PDSCH reception occasions for the set of SLIVs corresponding to each DL slot belonging to the set of DL slots FIG. 16 depicts an example for determining a set of SLIVs for a set of DL slots for multi-PDSCH repetitions, in accordance with certain aspects of the present disclosure. This example corresponds to the third aspect and assumes that the number of repetitions fixed or configured by RRC is two. It is also assumed that there is inter-slot repetition for each TB. As shown, for determining the set of candidate PDSCH reception occasions, the UE first determines the set of DL slots 1610 (slots n−9, n−8, . . . , n−1). Then, the UE determines the set of SLIVs 1620 for each DL slot. As shown, the set of SLIVs are selected from the SLIVs in the table and are corresponding to the SLIVs associated with any repetition of each TB. The UE determines the set of candidate PDSCH occasions (e.g., j={0, 1, 2, 3, . . . , 8}) based on the set of DL slots 1610 and the set of SLIVs 1620, according to certain rules (e.g., Rel-16).

Figure 17:
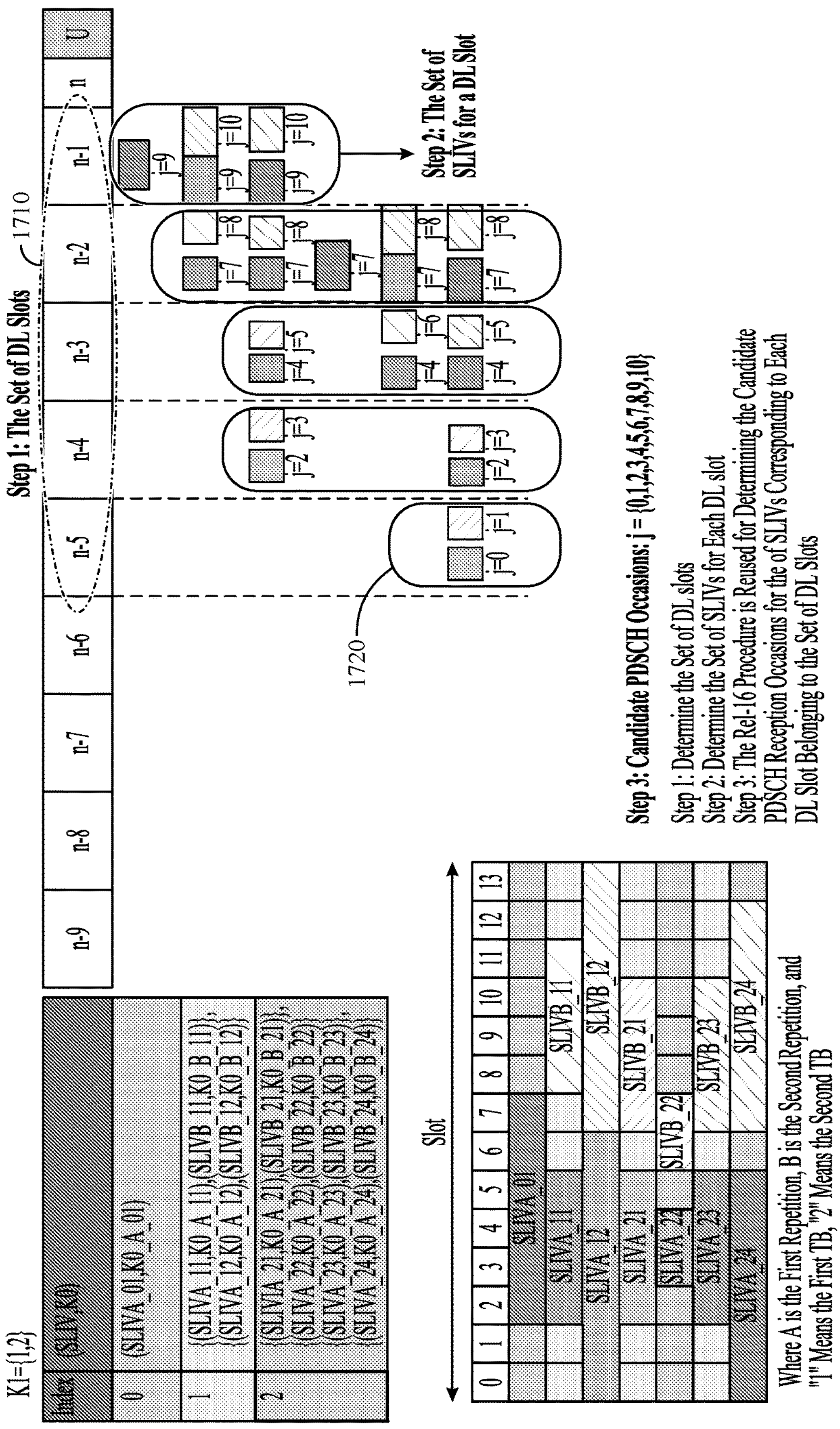

FIG. 17 depicts an example for determining a set of SLIVs for a set of DL slots for multi-PDSCH repetitions when each repetition of each TB includes a respective SLIV and slot timing value, in accordance with certain aspects of the present disclosure. This example corresponds to the third aspect and assumes that each repetition of each TB has its own SLIV and K0. As shown, for determining the set of candidate PDSCH reception occasions, the UE first determines the set of DL slots 1710 (e.g., slots n−5, n−4, . . . , n−1). Then, the UE determines the set of SLIVs 1720 for each DL slot. As shown, the set of SLIVs correspond to the SLIVs in the table and are corresponding to the SLIVs associated with any repetition of each TB, where A indicates the first repetition and B the second repetition. The numeric subscripts "1" indicates the first TB, and "2" indicates the second TB. The UE determines the set of candidate PDSCH occasions (e.g., j={0, 1, 2, 3, . . . , 10}) based on the set of DL slots 1710 and the set of SLIVs 1720, according to certain rules.

Figure 18:
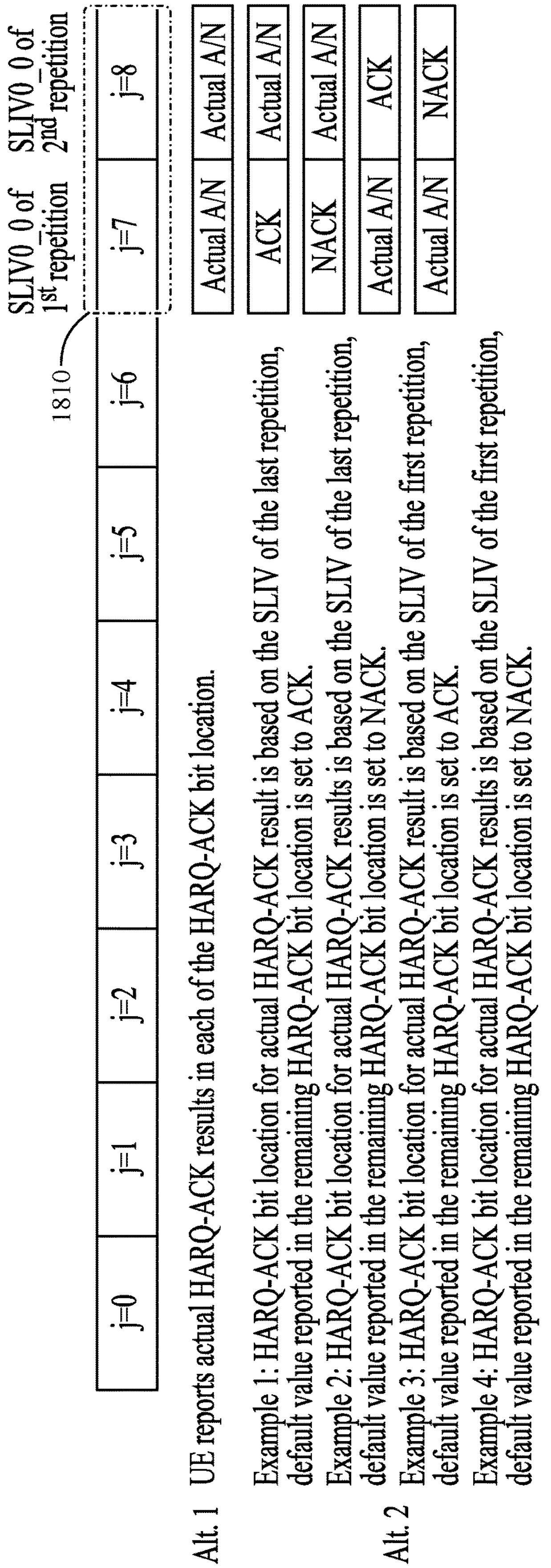
FIG. 18 depicts an example for determining HARQ-ACK bit locations and report results, in accordance with certain aspects of the present disclosure.

In certain specific aspects of the third aspect, different candidate PDSCH reception occasions may be generated for different repetitions of a single PDSCH or TB. The UE may determine the HARQ-ACK bit location and HARQ-ACK report result correspondingly. Alternative options may be used. FIG. 18 depicts these two alternative examples.

In a first alternative, the UE may report the actual HARQ-ACK results in each of the HARQ-ACK bit location 1810 corresponding to a same PDSCH or TB. As shown, each of the HARQ-ACK bit location 1810 (e.g., j=7 and j=8) may be used to report the actual HARQ-ACK results (ACK or NACK, "A/N").

In a second alternative, the UE may select one HARQ-ACK bit location to report the actual HARQ-ACK result while the UE reports a fixed or default value in the remaining HARQ-ACK bit location. The HARQ-ACK bit location for actual HARQ-ACK result can be the one associated with the candidate PDSCH reception occasion determined based on the SLIV of last repetition or the first repetition. The fixed or default value reported in the remaining HARQ-ACK bit location can be ACK or NACK.

As shown in Example 1, the HARQ-ACK bit location for actual HARQ-ACK result is based on the SLIV of the last repetition. The default value reported in the remaining HARQ-ACK bit location is set to ACK. Similarly, in Example 2, the HARQ-ACK bit location for actual HARQ-ACK result is based on the SLIV of the last repetition. The default value reported in the remaining HARQ-ACK bit location is set to NACK.

As shown in Example 3, the HARQ-ACK bit location for actual HARQ-ACK result is based on the SLIV of the first repetition. The default value reported in the remaining HARQ-ACK bit location is set to ACK. Similarly, in Example 4, the HARQ-ACK bit location for actual HARQ-ACK result is based on the SLIV of the first repetition. The default value reported in the remaining HARQ-ACK bit location is set to NACK.

In certain specific aspects of the third aspect, the UE may further determine the number of HARQ-ACK information bits for obtaining transmission power for a PUCCH. For example, if the number of UCI bits is less than 11, when the UE determines a number of HARQ-ACK information bits for obtaining transmission power for a PUCCH, the HARQ-ACK information bits (corresponding to the PDSCH reception occasions where the UE does not receive a corresponding PDSCH (i.e., dummy NACK bits)) are not counted. If multiple PDSCH reception occasions are generated for a single PDSCH or TB, the UE may determine the number of HARQ-ACK information bits for obtaining transmission power for a PUCCH. Alternative options may be used for this determination.

In a first option, if the number of UCI bits is less than 11, and when the LIE determines a number of HARQ-ACK information bits for obtaining transmission power for a PUCCH, each candidate PDSCH occasion is counted separately, if the UE reports actual HARQ-ACK result in each of the HARQ-ACK bit location corresponding to a same PDSCH or TB (i.e., the first alternative above). For example, the M, in the following equation may include each candidate PDSCH occasion corresponding to a single PDSCH or TB.

$$n_{HARQ\text{-}ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}$$

However, if the UE report the actual HARQ-ACK result in one of the HARQ-ACK bit location corresponding to a same PDSCH/TB (i.e., the second alternative above), only the candidate PDSCH occasion with actual HARQ-ACK result is counted. For example, the M, in the above equation may include only the candidate PDSCH occasion with actual HARQ-ACK result.

In a second option, if the number of UCI bits is less than 11, and when the UE determines a number of HARQ-ACK information bits for obtaining transmission power for a PUCCH, regardless of which alternative above is implemented, the LIE counts the candidate PDSCH occasion once for a same PDSCH or TB. When the first alternative is implemented, the UE may implement either the first or the last candidate PDSCH occasion, as predefined. When the second alternative is implemented, the UE may consider only the candidate PDSCH occasion with the actual HARQ-ACK result.

EXAMPLE METHODS

Figure 19:
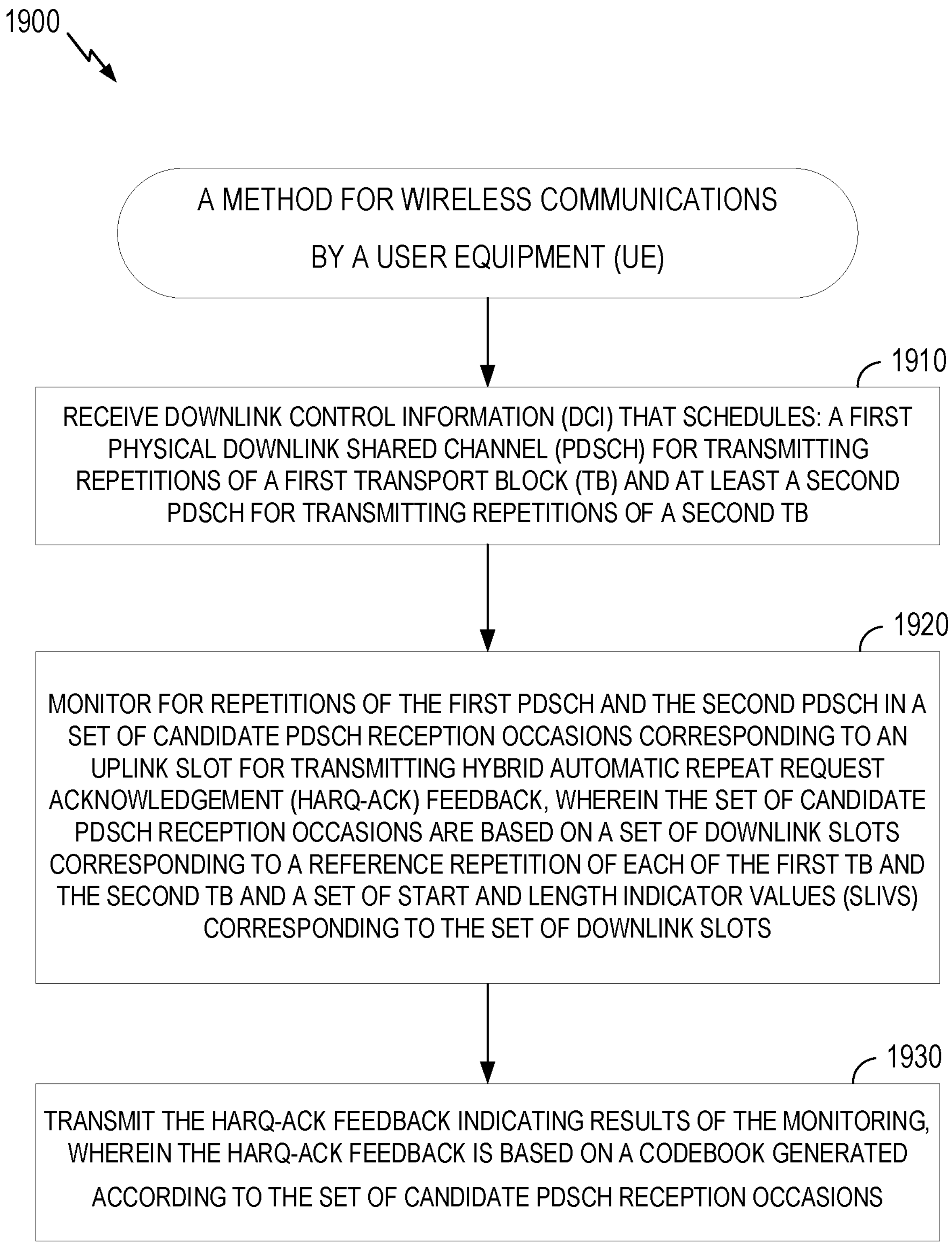
FIG. 19 and FIG. 20 show example methods for transmitting acknowledgement feedback, according to aspects of the present disclosure.

FIG. 19 shows an example of a method 1900 for providing feedback based on a set of candidate PDSCH reception occasions, according to aspects of the present disclosure. In some aspects, a UE, such as the UE 104 of FIGS. 1 and 2, or processing system 2105 of FIG. 21, may perform the method 1900.

At operation 1910, the UE receives DCI that schedules a first PDSCH for transmitting repetitions of a first TB and at least a second PDSCH for transmitting repetitions of a second TB. In some cases, the operations of this step refer to, or may be performed by, the circuitry for evaluating as described with reference to FIG. 21.

At operation 1920, the UE monitors for repetitions of the first PDSCH and the second PDSCH in a set of candidate PDSCH reception occasions corresponding to an uplink slot for transmitting hybrid automatic repeat request acknowledgement HARQ-ACK feedback. The set of candidate PDSCH reception occasions are based on a set of downlink slots corresponding to a reference repetition of each of the first TB and the second TB and a set of SLIVs corresponding to the set of downlink slots. In some cases, the operations of this step refer to, or may be performed by, the circuitry for logging as described with reference to FIG. 21.

At operation 1930, the UE transmits the HARQ-ACK feedback indicating results of the monitoring. The HARQ-ACK feedback is based on a codebook generated according to the set of candidate PDSCH reception occasions. In some cases, the operations of this step refer to, or may be performed by, the circuitry for declaring as described with reference to FIG. 21.

In aspects, the UE may generate the codebook according to the set of candidate PDSCH reception occasions. The codebook may be a Type-1 HARQ-ACK codebook.

In aspects, the UE determines the set of candidate PDSCH reception occasions by removing one or more of the set of SLIVs overlapping with one or more uplink symbols.

In aspects, the reference repetition of each TB is a last repetition of that TB based on combinations of configured HARQ-ACK feedback timing values and configured rows of a time domain resource allocation (TDRA) table.

In aspects, the reference repetition of each TB is a first repetition of that TB based on combinations of configured HARQ-ACK feedback timing values and configured rows of a TDRA table.

In aspects, the set of SLIVs includes SLIVs corresponding to the reference repetition for each TB determined based on combinations of configured HARQ-ACK feedback timing values and configured rows of the TDRA table. In some cases, the UE further determines the set of SLIVs by removing, from the set of SLIVs, at least one SLIV associated with the reference repetition of the first TB or the second TB if at least one condition is met.

For example, in one option, the at least one condition includes a condition that every repetition of the first TB or the second TB associated with the at least one SLIV overlaps with an uplink symbol. In a second option, the at least one condition includes a condition that a last repetition of the first TB or the second TB associated with the at least one SLIV overlaps with an uplink symbol.

In a third option, the at least one condition includes: a first condition and a second condition. The first condition applies to TB(s) that are not a last TB among the first TB and the second TB. The first condition includes that every repetition of the TB overlaps with an uplink symbol. The second condition applies to a last TB among the first TB and the second TB. The second condition includes that the last repetition of the last TB overlaps with an uplink symbol.

In aspects, the reference repetition of each TB is any repetition of that TB based on combinations of configured HARQ-ACK feedback timing values and configured rows of a TDRA table. The set of SLIVs comprises SLIVs corresponding to any repetition of each TB for a corresponding downlink slot based on combinations of the configured HARQ-ACK feedback timing values and the configured rows of the TDRA table.

In aspects, the UE reports, in the HARQ-ACK feedback, actual hybrid automatic repeat request acknowledgement (HARQ-ACK) results in each HARQ-ACK bit locations of a corresponding PDSCH or TB.

In aspects, the UE may select a hybrid automatic repeat request acknowledgement (HARQ-ACK) bit location. The UE may report, in the HARQ-ACK feedback, actual HARQ-ACK results in the selected HARQ-ACK bit location; and report a constant value in remaining HARQ-ACK bit location(s). In some cases, the HARQ-ACK bit location is selected based on one of the candidate PDSCH reception occasions.

In aspects, the UE may determine the set of candidate PDSCH reception occasions by counting each PDSCH reception occasion separately for obtaining transmission power for a PUCCH when the UE reports, in the HARQ-ACK feedback, the actual HARQ-ACK results in each of the HARQ-ACK bit locations.

In some cases, the UE determines the set of candidate PDSCH reception occasions by: counting only a PDSCH reception occasion with actual HARQ-ACK results for obtaining transmission power for a PUCCH when the UE reports, in the HARQ-ACK feedback, the actual HARQ-ACK results in one of the HARQ-ACK bit locations.

In some cases, the UE determines the set of candidate PDSCH reception occasions by: counting, for obtaining transmission power for a PUCCH, a PDSCH reception occasion once for repetition of a same TB.

In aspects, the UE receives RRC signaling configuring a same number of repetitions to be applied when transmitting repetitions of the first TB with the first PDSCH as when transmitting repetitions of the second TB with the second PDSCH.

In aspects, the UE receives a TDRA table configuring a same number of repetitions to be applied when transmitting repetitions of the first TB with the first PDSCH as when transmitting repetitions of the second TB with the second PDSCH.

In aspects, the UE receives a TDRA table configuring a first number of repetitions to be applied when transmitting repetitions of the first TB with the first PDSCH and configuring a second number of repetitions to be applied when transmitting repetitions of the second TB with the second PDSCH.

In aspects, a set of SLIVs is configured for each repetition of the first TB and the second TB.

Figure 20:
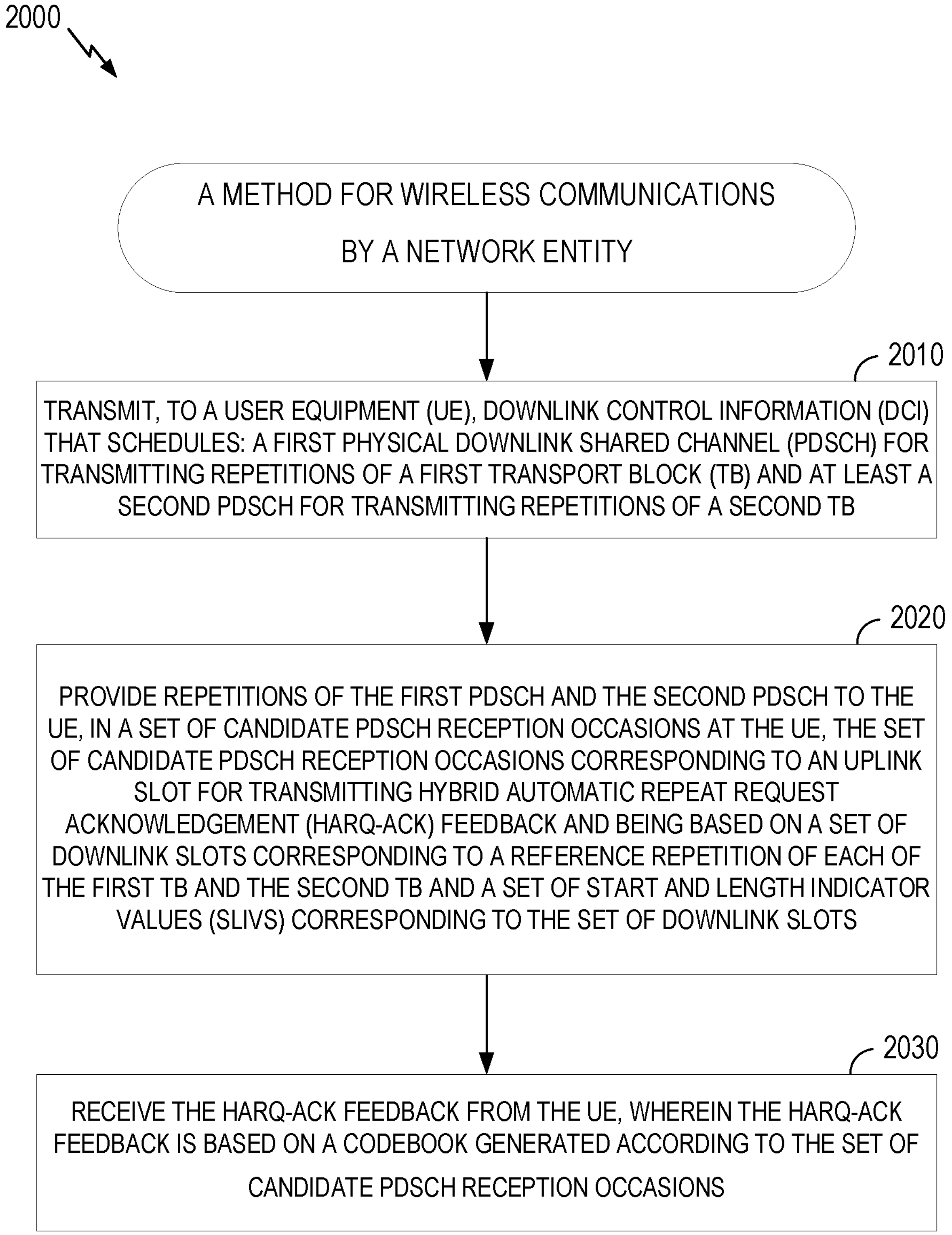

FIG. 20 shows an example of a method 2000 for receiving HARQ-ACK feedback, according to aspects of the present disclosure. In some aspects, a base station, such as the base station 102 of FIGS. 1 and 2, or processing system 2205 of FIG. 22, may perform the method 2000. The method 2000 may be complementary to the method 1900 as discussed above, with similar detailed aspects.

At operation 2010, the base station transmits, to a UE, DCI that schedules a first PDSCH for transmitting repetitions of a first TB and at least a second PDSCH for transmitting repetitions of a second TB. In some cases, the operations of this step refer to, or may be performed by, the circuitry for transmitting as described with reference to FIG. 22.

At operation 2020, the base station provides repetitions of the first PDSCH and the second PDSCH to the UE, in a set of candidate PDSCH reception occasions at the UE. The set of candidate PDSCH reception occasions corresponds to an uplink slot for transmitting HARQ-ACK feedback and is based on a set of downlink slots corresponding to a reference repetition of each of the first TB and the second TB and a set of SLIVs corresponding to the set of downlink slots. In some cases, the operations of this step refer to, or may be performed by, the circuitry for receiving as described with reference to FIG. 22.

At operation 2030, the base station receives the HARQ-ACK feedback from the UE. The HARQ-ACK feedback is based on a codebook generated according to the set of candidate PDSCH reception occasions. In some cases, the operations of this step refer to, or may be performed by, the circuitry for inferring as described with reference to FIG. 22.

Example Wireless Communication Devices

Figure 21:
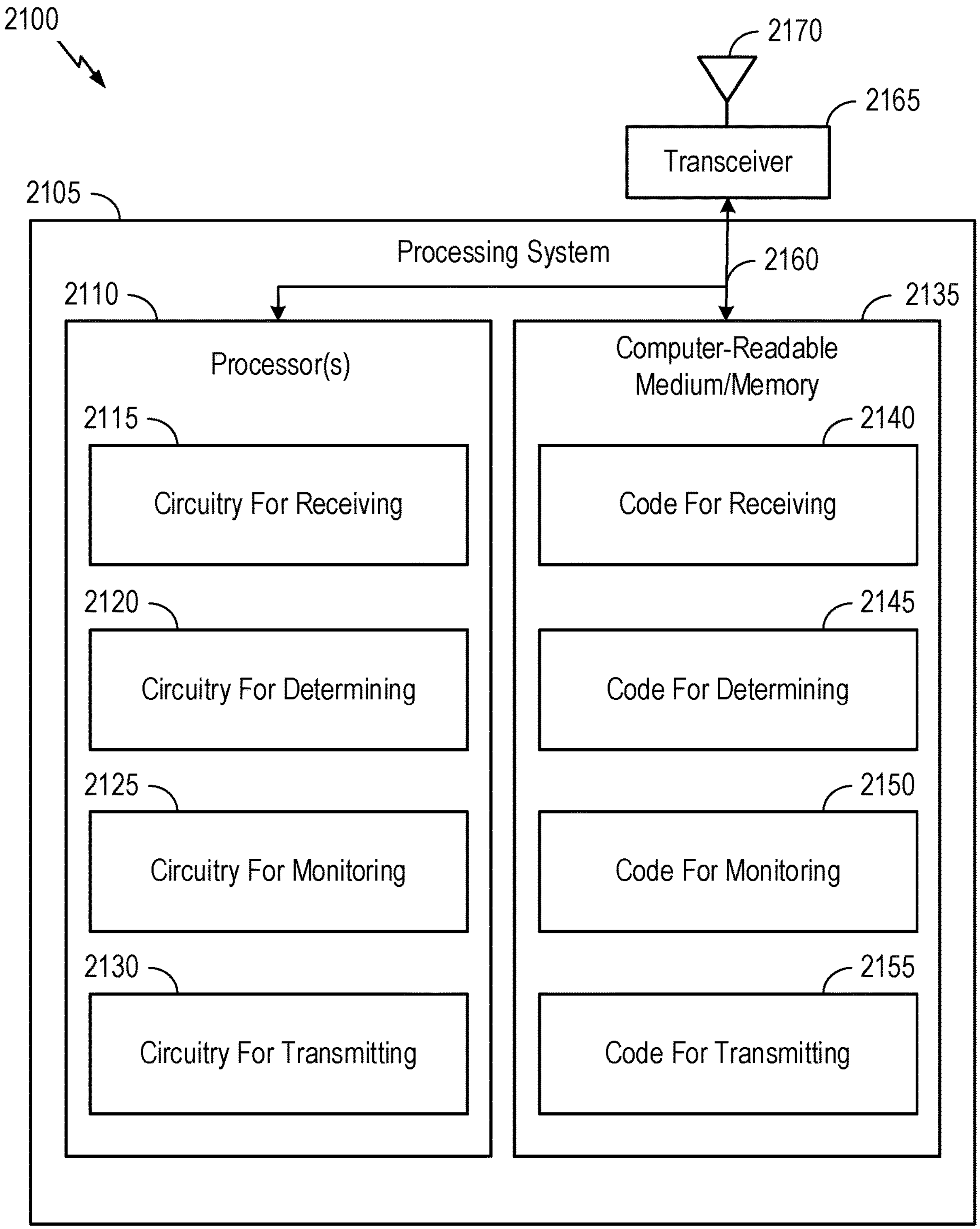
FIG. 21 and FIG. 22 show examples of a communications device according to aspects of the present disclosure.

FIG. 21 depicts an example communications device 2100 that includes various components operable, configured, or adapted to perform operations for the techniques disclosed herein, such as the operations depicted and described with respect to FIG. 19. In some examples, communication device may be a user equipment 104 as described, for example with respect to FIGS. 1 and 2.

Communications device 2100 includes a processing system 2105 coupled to a transceiver 2165 (e.g., a transmitter and/or a receiver). Transceiver 2165 is configured to transmit (or send) and receive signals for the communications device 2100 via an antenna 2170, such as the various signals as described herein. A transceiver 2165 may communicate bi-directionally, via antennas 2170, wired, or wireless links as described above. For example, the transceiver 2165 may represent a wireless transceiver 2165 and may communicate bi-directionally with another wireless transceiver 2165. The transceiver 2165 may also include or be connected to a modem to modulate the packets and provide the modulated packets to for transmission, and to demodulate received packets. In some examples, transceiver 2165 may be tuned to operate at specified frequencies. For example, a modem can configure the transceiver 2165 to operate at a specified frequency and power level based on the communication protocol used by the modem.

Processing system 2105 may be configured to perform processing functions for communications device 2100, including processing signals received and/or to be transmitted by communications device 2100. Processing system 2105 includes one or more processors 2110 coupled to a computer-readable medium/memory 2135 via a bus 2160.

In some examples, one or more processors 2110 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 2110 are configured to operate a memory array using a memory controller. In other cases, a memory controller is integrated into the one or more processors 2110. In some cases, the one or more processors 2110 are configured to execute computer-readable instructions stored in a memory to perform various functions. In some aspects, one or more processors 2110 include special purpose components for modem processing, baseband processing, digital signal processing, or transmission processing.

In certain aspects, computer-readable medium/memory 2135 is configured to store instructions (e.g., computer-executable code) that when executed by the one or more processors 2110, cause the one or more processors 2110 to perform the operations illustrated in FIG. 19, or other operations for performing the various techniques discussed herein.

In one aspect, computer-readable medium/memory 2135 includes the code for receiving 2140, the code for determining 2145, the code for monitoring 2150, and the code for transmitting 2155, which enable the UE to perform the operation 1900 of FIG. 19.

Examples of a computer-readable medium/memory 2135 include random access memory (RAM), read-only memory (ROM), solid state memory, a hard drive, a hard disk drive, etc. In some examples, computer-readable medium/memory 2135 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In one aspect, one or more processors 2110 includes the circuitry for receiving 2115, the circuitry for determining 2120, the circuitry for monitoring 2125, and the circuitry for transmitting 2130, which enable the UE to perform the operation 1900 of FIG. 19.

Various components of communications device 2100 may provide means for performing the methods described herein, including with respect to FIG. 19.

In some examples, means for transmitting or sending (or means for outputting for transmission) may include the transceivers 254 and/or antenna(s) 252 of the user equipment 104 illustrated in FIG. 2 and/or transceiver 2165 and antenna 2170 of the communication device in FIG. 21.

In some examples, means for receiving (or means for obtaining) may include the transceivers 254 and/or antenna (s) 252 of the user equipment 104 illustrated in FIG. 2 and/or transceiver 2165 and antenna 2170 of the communication device in FIG. 21.

In some examples, means for determining, monitoring, and/or processing may include various processing system 2105 components, such as: the one or more processors 2110 in FIG. 21, or aspects of the user equipment 104 depicted in FIG. 2, including receive processor 258, transmit processor 264, TX MIMO processor 266, and/or controller/processor 280 (including feedback processing component 281).

Notably, FIG. 21 is just use example, and many other examples and configurations of communication device are possible.

Figure 22:
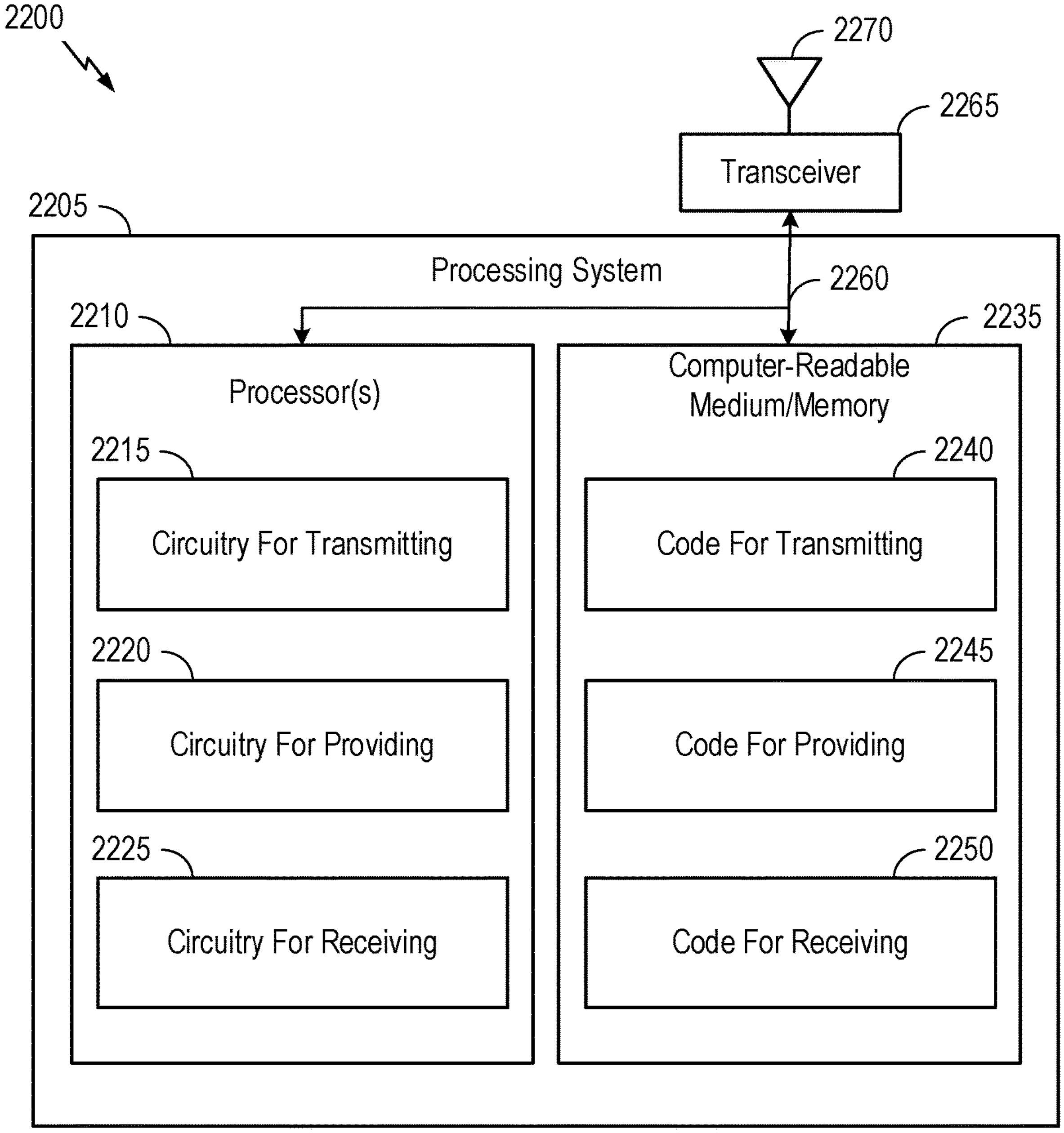

FIG. 22 depicts an example communications device 2200 that includes various components operable, configured, or adapted to perform operations for the techniques disclosed herein, such as the operations depicted and described with respect to FIG. 20. In some examples, communication device may be a base station 102 as described, for example with respect to FIGS. 1 and 2.

Communications device 2200 includes a processing system 2205 coupled to a transceiver 2265 (e.g., a transmitter and/or a receiver). Transceiver 2265 is configured to transmit (or send) and receive signals for the communications device 2200 via an antenna 2270, such as the various signals as described herein. In some aspects, transceiver 2265 is an example of, or includes aspects of, the corresponding element described with reference to FIG. 21.

Processing system 2205 may be configured to perform processing functions for communications device 2200, including processing signals received and/or to be transmitted by communications device 2200. In some aspects, the one or more processors 2210 are examples of, or include aspects of, the corresponding elements described with reference to FIG. 21.

Processing system 2205 includes one or more processors 2210 coupled to a computer-readable medium/memory 2235 via a bus 2260. In certain aspects, computer-readable medium/memory 2235 is configured to store instructions (e.g., computer-executable code) that when executed by the one or more processors 2210, cause the one or more processors 2210 to perform the operations illustrated in FIG. 20, or other operations for performing the various techniques discussed herein. In some aspects, computer-readable medium/memory 2235 is an example of, or includes aspects of, the corresponding element described with reference to FIG. 21.

In one aspect, computer-readable medium/memory 2235 includes the code for transmitting 2240, the code for providing 2245, and the code for receiving 2250, which enable the BS to perform the operation 2000 of FIG. 20.

Examples of a computer-readable medium/memory 2235 include random access memory (RAM), read-only memory (ROM), solid state memory, a hard drive, a hard disk drive, etc. In some examples, computer-readable medium/memory 2235 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In one aspect, one or more processors 2210 includes the circuitry for transmitting 2215, the circuitry for providing 2220, and the circuitry for receiving 2225, which enable the BS to perform the operation 2000 of FIG. 20.

Various components of communications device 2200 may provide means for performing the methods described herein, including with respect to FIG. 20.

In some examples, means for transmitting or sending (or means for outputting for transmission) may include the transceivers 232 and/or antenna(s) 234 of the base station 102 illustrated in FIG. 2 and/or transceiver 2265 and antenna 2270 of the communication device in FIG. 22.

In some examples, means for receiving (or means for obtaining) may include the transceivers 232 and/or antenna (s) 234 of the base station 102 illustrated in FIG. 2 and/or transceiver 2265 and antenna 2270 of the communication device in FIG. 22.

In some examples, means for inferring may include various processing system 2205 components, such as: the one or more processors 2210 in FIG. 22, or aspects of the base station 102 depicted in FIG. 2, including receive processor 238, transmit processor 220, TX MIMO processor 230, and/or controller/processor 240 (including feedback processing component 241).

Notably, FIG. 22 is just use example, and many other examples and configurations of communication device are possible.

EXAMPLE CLAUSES

Implementation examples are described in the following numbered clauses:

Clause 1: A method for wireless communications by a user equipment (UE), comprising: receiving downlink control information (DCI) that schedules: a first physical downlink shared channel (PDSCH) for transmitting repetitions of a first transport block (TB) and at least a second PDSCH for transmitting repetitions of a second TB; monitoring for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and transmitting the HARQ-ACK feedback indicating results of the monitoring, wherein the HARQ-ACK feedback is based on a codebook generated according to the set of candidate PDSCH reception occasions.

Clause 2: The method of Clause 1, further comprising generating the codebook according to the set of candidate PDSCH reception occasions.

Clause 3: The method of Clause 2, wherein the codebook is a Type-1 HARQ-ACK codebook.

Clause 4: The method of Clause 1, wherein determining the set of candidate PDSCH reception occasions comprises removing one or more of the set of SLIVs overlapping with one or more uplink symbols.

Clause 5: The method of Clause 1, wherein the reference repetition of each TB is a last repetition of that TB based on combinations of configured HARQ-ACK feedback timing values and configured rows of a time domain resource allocation (TDRA) table.

Clause 6: The method of Clause 1, wherein the reference repetition of each TB is a first repetition of that TB based on combinations of configured HARQ-ACK feedback timing values and configured rows of a time domain resource allocation (TDRA) table.

Clause 7: The method of any one of Clauses 1-6, wherein the set of SLIVs comprises SLIVs corresponding to the reference repetition for each TB determined based on combinations of configured HARQ-ACK feedback timing values and configured rows of a time domain resource allocation (TDRA) table.

Clause 8: The method of Clause 7, further comprising determining the set of SLIVs by: removing, from the set of SLIVs, at least one SLIV associated with the reference repetition of the first TB or the second TB if at least one condition is met.

Clause 9: The method of Clause 8, wherein the at least one condition comprises a condition that every repetition of the first TB or the second TB associated with the at least one SLIV overlaps with an uplink symbol.

Clause 10: The method of Clause 8, wherein the at least one condition comprises a condition that a last repetition of the first TB or the second TB associated with the at least one SLIV overlaps with an uplink symbol.

Clause 11: The method of Clause 8, wherein the at least one condition comprises: a first condition, applied to TB(s) that are not a last TB among the first TB and the second TB, that every repetition of the TB overlaps with an uplink symbol; and a second condition, applied to a last TB among the first TB and the second TB, that the last repetition of the last TB overlaps with an uplink symbol.

Clause 12: The method of Clause 1, wherein the reference repetition of each TB is any repetition of that TB based on combinations of configured HARQ-ACK feedback timing values and configured rows of a time domain resource allocation (TDRA) table.

Clause 13: The method of Clause 12, wherein the set of SLIVs comprises SLIVs corresponding to any repetition of each TB for a corresponding downlink slot based on combinations of the configured HARQ-ACK feedback timing values and the configured rows of the TDRA table.

Clause 14: The method of Clause 12, further comprising: reporting, in the HARQ-ACK feedback, actual hybrid automatic repeat request acknowledgement (HARQ-ACK) results in each HARQ-ACK bit locations of a corresponding PDSCH or TB.

Clause 15: The method of Clause 12, further comprising: selecting a hybrid automatic repeat request acknowledgement (HARQ-ACK) bit location; reporting, in the HARQ-ACK feedback, actual HARQ-ACK results in the selected HARQ-ACK bit location; and reporting a constant value in remaining HARQ-ACK bit location(s).

Clause 16: The method of Clause 15, wherein selecting the HARQ-ACK bit location is based on one of the candidate PDSCH reception occasions.

Clause 17: The method of Clause 14, wherein determining the set of candidate PDSCH reception occasions comprises: counting each PDSCH reception occasion separately for obtaining transmission power for a PUCCH when the UE reports, in the HARQ-ACK feedback, the actual HARQ-ACK results in each of the HARQ-ACK bit locations.

Clause 18: The method of Clause 15, wherein determining the set of candidate PDSCH reception occasions comprises: counting only a PDSCH reception occasion with actual HARQ-ACK results for obtaining transmission power for a PUCCH when the UE reports, in the HARQ-ACK feedback, the actual HARQ-ACK results in one of the HARQ-ACK bit locations.

Clause 19: The method of Clause 12, wherein determining the set of candidate PDSCH reception occasions comprises: counting, for obtaining transmission power for a PUCCH, a PDSCH reception occasion once for repetition of a same TB.

Clause 20: The method of Clause 1, further comprising: receiving RRC signaling configuring a same number of repetitions to be applied when transmitting repetitions of the first TB with the first PDSCH as when transmitting repetitions of the second TB with the second PDSCH.

Clause 21: The method of Clause 1, further comprising: receiving a time domain resource allocation (TDRA) table configuring a same number of repetitions to be applied when transmitting repetitions of the first TB with the first PDSCH as when transmitting repetitions of the second TB with the second PDSCH.

Clause 22: The method of Clause 1, further comprising: receiving a time domain resource allocation (TDRA) table configuring a first number of repetitions to be applied when transmitting repetitions of the first TB with the first PDSCH and configuring a second number of repetitions to be applied when transmitting repetitions of the second TB with the second PDSCH.

Clause 23: The method of Clause 1, wherein a set of SLIVs is configured for each repetition of the first TB and the second TB.

Clause 24: A method for wireless communications by a network entity, comprising: transmitting, to a user equipment (UE), downlink control information (DCI) that schedules: a first physical downlink shared channel (PDSCH) for transmitting repetitions of a first transport block (TB) and at least a second PDSCH for transmitting repetitions of a second TB; providing repetitions of the first PDSCH and the second PDSCH to the UE, in a set of candidate PDSCH reception occasions at the UE, the set of candidate PDSCH reception occasions corresponding to an uplink slot for transmitting hybrid automatic repeat request acknowledgement (HARQ-ACK) feedback and being based on a set of downlink slots corresponding to a reference repetition of each of the first TB and the second TB and a set of start and length indicator values (SLIVs) corresponding to the set of downlink slots; and receiving the HARQ-ACK feedback from the UE, wherein the HARQ-ACK feedback is based on a codebook generated according to the set of candidate PDSCH reception occasions.

Clause 25: An apparatus for wireless communications, comprising: a memory; and a processor coupled to the memory, the processor and the memory configured to: receive downlink control information (DCI) that schedules: a first physical downlink shared channel (PDSCH) for transmitting repetitions of a first transport block (TB) and at least a second PDSCH for transmitting repetitions of a second TB; monitor for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and transmit the HARQ-ACK feedback indicating results of the monitoring, wherein the HARQ-ACK feedback is based on a codebook generated according to the set of candidate PDSCH reception occasions.

Clause 26: The apparatus of Clause 25, wherein the processor and the memory are further configured to generate the codebook according to the set of candidate PDSCH reception occasions.

Clause 27: The apparatus of Clause 26, wherein the codebook is a Type-1 hybrid automatic repeat request acknowledgement (HARQ-ACK) codebook.

Clause 28: The apparatus of Clause 25, wherein the processor and the memory are configured to determine the set of candidate PDSCH reception occasions by removing one or more of the set of SLIVs overlapping with one or more uplink symbols.

Clause 29: The apparatus of Clause 25, wherein the reference repetition of each TB is a last or a first repetition of that TB based on combinations of configured HARQ-ACK feedback timing values and configured rows of a time domain resource allocation (TDRA) table.

Clause 30: An apparatus for wireless communications, comprising: means for receiving downlink control information (DCI) that schedules: a first physical downlink shared channel (PDSCH) for transmitting repetitions of a first transport block (TB) and at least a second PDSCH for transmitting repetitions of a second TB; means for monitoring for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and means for transmitting the HARQ-ACK feedback indicating results of the monitoring, wherein the HARQ-ACK feedback is based on a codebook generated according to the set of candidate PDSCH reception occasions.

Clause 31: A processing system, comprising: a memory comprising computer-executable instructions; one or more processors configured to execute the computer-executable instructions and cause the processing system to perform a method in accordance with any one of Clauses 1-24.

Clause 32: A processing system, comprising means for performing a method in accordance with any one of Clauses 1-24.

Clause 33: A non-transitory computer-readable medium comprising computer-executable instructions that, when executed by one or more processors of a processing system, cause the processing system to perform a method in accordance with any one of Clauses 1-24.

Clause 34: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of [SHORT INVENTION DESCRIPTION] in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g.

5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
- receiving downlink control information (DCI) that schedules: a first physical downlink shared channel (PDSCH) for transmitting repetitions of a first transport block (TB) and at least a second PDSCH for transmitting repetitions of a second TB;
- monitoring for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and
- transmitting the HARQ-ACK feedback indicating results of the monitoring,
- wherein the HARQ-ACK feedback is based on a codebook generated according to the set of candidate PDSCH reception occasions.

2. The method of claim 1, further comprising generating the codebook according to the set of candidate PDSCH reception occasions.

3. The method of claim 2, wherein the codebook is a Type-1 HARQ-ACK codebook.

4. The method of claim 1, wherein determining the set of candidate PDSCH reception occasions comprises removing one or more of the set of SLIVs overlapping with one or more uplink symbols.

5. The method of claim 1, wherein the reference repetition of each TB is a last repetition of that TB based on combinations of configured HARQ-ACK feedback timing values and configured rows of a time domain resource allocation (TDRA) table.

6. The method of claim 1, wherein the reference repetition of each TB is a first repetition of that TB based on combinations of configured HARQ-ACK feedback timing values and configured rows of a time domain resource allocation (TDRA) table.

7. The method of claim 1, wherein the set of SLIVs comprises SLIVs corresponding to the reference repetition for each TB determined based on combinations of configured HARQ-ACK feedback timing values and configured rows of a time domain resource allocation (TDRA) table.

8. The method of claim 7, further comprising determining the set of SLIVs by: removing, from the set of SLIVs, at least one SLIV associated with the reference repetition of the first TB or the second TB if at least one condition is met.

9. The method of claim 8, wherein the at least one condition comprises a condition that every repetition of the first TB or the second TB associated with the at least one SLIV overlaps with an uplink symbol.

10. The method of claim 8, wherein the at least one condition comprises a condition that a last repetition of the first TB or the second TB associated with the at least one SLIV overlaps with an uplink symbol.

11. The method of claim 8, wherein the at least one condition comprises: a first condition, applied to TB(s) that are not a last TB among the first TB and the second TB, that every repetition of the TB overlaps with an uplink symbol; and a second condition, applied to a last TB among the first TB and the second TB, that the last repetition of the last TB overlaps with an uplink symbol.

12. The method of claim 1, wherein the reference repetition of each TB is any repetition of that TB based on combinations of configured HARQ-ACK feedback timing values and configured rows of a time domain resource allocation (TDRA) table.

13. The method of claim 12, wherein the set of SLIVs comprises SLIVs corresponding to any repetition of each TB for a corresponding downlink slot based on combinations of the configured HARQ-ACK feedback timing values and the configured rows of the TDRA table.

14. The method of claim 12, further comprising: reporting, in the HARQ-ACK feedback, actual hybrid automatic repeat request acknowledgement (HARQ-ACK) results in each HARQ-ACK bit locations of a corresponding PDSCH or TB.

15. The method of claim 12, further comprising: selecting a hybrid automatic repeat request acknowledgement (HARQ-ACK) bit location; reporting, in the HARQ-ACK feedback, actual HARQ-ACK results in the HARQ-ACK bit location; and reporting a constant value in remaining HARQ-ACK bit location(s).

16. The method of claim 15, wherein selecting the HARQ-ACK bit location is based on one of the candidate PDSCH reception occasions.

17. The method of claim 14, wherein determining the set of candidate PDSCH reception occasions comprises: counting each PDSCH reception occasion separately for obtaining transmission power for a PUCCH when the UE reports, in the HARQ-ACK feedback, the actual HARQ-ACK results in each of the HARQ-ACK bit locations.

18. The method of claim 15, wherein determining the set of candidate PDSCH reception occasions comprises: counting only a PDSCH reception occasion with actual HARQ-ACK results for obtaining transmission power for a PUCCH when the UE reports, in the HARQ-ACK feedback, the actual HARQ-ACK results in one of the HARQ-ACK bit locations.

19. The method of claim 12, wherein determining the set of candidate PDSCH reception occasions comprises: counting, for obtaining transmission power for a PUCCH, a PDSCH reception occasion once for repetition of a same TB.

20. The method of claim 1, further comprising: receiving radio resource control (RRC) signaling configuring a same number of repetitions to be applied when transmitting repetitions of the first TB with the first PDSCH as when transmitting repetitions of the second TB with the second PDSCH.

21. The method of claim 1, further comprising: receiving a time domain resource allocation (TDRA) table configuring a same number of repetitions to be applied when transmitting repetitions of the first TB with the first PDSCH as when transmitting repetitions of the second TB with the second PDSCH.

22. The method of claim 1, further comprising: receiving a time domain resource allocation (TDRA) table configuring a first number of repetitions to be applied when transmitting repetitions of the first TB with the first PDSCH and configuring a second number of repetitions to be applied when transmitting repetitions of the second TB with the second PDSCH.

23. The method of claim 1, wherein a set of SLIVs is configured for each repetition of the first TB and the second TB.

24. A method for wireless communications by a network entity, comprising:

transmitting, to a user equipment (UE), downlink control information (DCI) that schedules: a first physical downlink shared channel (PDSCH) for transmitting repetitions of a first transport block (TB) and at least a second PDSCH for transmitting repetitions of a second TB;

providing repetitions of the first PDSCH and the second PDSCH to the UE, in a set of candidate PDSCH reception occasions at the UE, the set of candidate PDSCH reception occasions corresponding to an uplink slot for transmitting hybrid automatic repeat request acknowledgement (HARQ-ACK) feedback and being based on a set of downlink slots corresponding to a reference repetition of each of the first TB and the second TB and a set of start and length indicator values (SLIVs) corresponding to the set of downlink slots; and receiving the HARQ-ACK feedback from the UE, wherein the HARQ-ACK feedback is based on a codebook generated according to the set of candidate PDSCH reception occasions.

25. An apparatus for wireless communications, comprising:

a memory; and a processor coupled to the memory, the processor and the memory configured to:

receive downlink control information (DCI) that schedules: a first physical downlink shared channel (PDSCH) for transmitting repetitions of a first transport block (TB) and at least a second PDSCH for transmitting repetitions of a second TB;

monitor for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and transmit the HARQ-ACK feedback indicating results of the monitoring, wherein the HARQ-ACK feedback is based on a codebook generated according to the set of candidate PDSCH reception occasions.

26. An apparatus for wireless communications, comprising:

means for receiving downlink control information (DCI) that schedules: a first physical downlink shared channel (PDSCH) for transmitting repetitions of a first transport block (TB) and at least a second PDSCH for transmitting repetitions of a second TB;

means for monitoring for repetitions of the first PDSCH and the second PDSCH in a set of candidate PDSCH reception occasions corresponding to an uplink slot for transmitting hybrid automatic repeat request acknowledgement (HARQ-ACK) feedback, wherein the set of candidate PDSCH reception occasions are based on a set of downlink slots corresponding to a reference repetition of each of the first TB and the second TB and a set of start and length indicator values (SLIVs) corresponding to the set of downlink slots; and means for transmitting the HARQ-ACK feedback indicating results of the monitoring, wherein the HARQ-ACK feedback is based on a codebook generated according to the set of candidate PDSCH reception occasions.

* * * * *